(12) United States Patent
Schneider et al.

(10) Patent No.: US 11,552,708 B2
(45) Date of Patent: *Jan. 10, 2023

(54) ROTATABLE OPTICAL SHORT-RANGE TRANSCEIVER

(71) Applicant: Fraunhofer-Gesellschaft zur Förderung der angewandten Forschung e.V., Munich (DE)

(72) Inventors: Tobias Schneider, Dresden (DE); Alexander Noack, Dresden (DE); Michael Faulwaßer, Dresden (DE)

(73) Assignee: Fraunhofer-Gesellschaft zur Förderung der angewandten Forschung e.V.

( * ) Notice: Subject to any disclaimer, the term of this patent is extended or adjusted under 35 U.S.C. 154(b) by 0 days.

This patent is subject to a terminal disclaimer.

(21) Appl. No.: 17/089,558

(22) Filed: Nov. 4, 2020

(65) Prior Publication Data

US 2021/0143912 A1 May 13, 2021

(30) Foreign Application Priority Data

Nov. 8, 2019 (DE) .................... 20 2019 106 231.2

(51) Int. Cl.
*H04B 10/114* (2013.01)
*H04B 10/40* (2013.01)
(Continued)

(52) U.S. Cl.
CPC ........... *H04B 10/40* (2013.01); *G02B 6/3604* (2013.01); *H04B 5/0031* (2013.01); *H04B 5/02* (2013.01); *H04B 10/1143* (2013.01)

(58) Field of Classification Search
CPC ................................................. H04B 10/1143
See application file for complete search history.

(56) References Cited

U.S. PATENT DOCUMENTS

| 4,401,360 A | 8/1983 | Streckmann et al. |
| 6,717,820 B1 * | 4/2004 | Loh ........................ H05K 1/141 |
| | | 257/E31.118 |

(Continued)

FOREIGN PATENT DOCUMENTS

| DE | 102018205559 B3 | 8/2019 | |
| DE | 102019202766 B3 | 8/2020 | |
| WO | WO-2007084209 A2 * | 7/2007 | ........... G02B 6/4246 |

OTHER PUBLICATIONS

Berglund et al., Fabrication of optical components using a consumer-grade lithographic printer, Oct. 2019 (Year: 2019).*

(Continued)

*Primary Examiner* — Jai M Lee
(74) *Attorney, Agent, or Firm* — Haynes and Boone, LLP

(57) ABSTRACT

An inventive rotatable optical short-range transceiver has: a support which is rotatable around a rotation axis, an optical receiver which is arranged at the support on the rotation axis to receive an optical reception signal from a first direction, an optical transmitter which is arranged at the support to be adjacent to the optical receiver to emit an optical transmission signal in a second direction, and an optical transmission/reception unit which is configured to allow interruption-free rotatable optical data communication, wherein the optical transmission/reception unit is arranged at the support above the optical receiver and extends over the optical receiver and the optical transmitter, and wherein the optical transmission/reception unit has a support structure for mounting at the support, which is implemented integrally with the optical transmission/reception unit.

25 Claims, 14 Drawing Sheets

(51) Int. Cl.
  *G02B 6/36*  (2006.01)
  *H04B 5/00*  (2006.01)
  *H04B 5/02*  (2006.01)

(56) References Cited

U.S. PATENT DOCUMENTS

| | | | | |
|---|---|---|---|---|
| 8,611,758 | B2* | 12/2013 | Kuo | H04B 10/803 |
| | | | | 398/164 |
| 8,989,588 | B2* | 3/2015 | Afriat | H04B 10/60 |
| | | | | 398/136 |
| 10,164,717 | B2* | 12/2018 | Kakimoto | G02B 6/3604 |
| 10,547,385 | B2* | 1/2020 | Hallal | H04B 10/40 |
| 10,756,824 | B2* | 8/2020 | Sundaram | G02B 6/4246 |
| 11,394,460 | B2* | 7/2022 | Schneider | H04B 10/1123 |
| 2011/0150493 | A1* | 6/2011 | Nakaso | H04B 10/1143 |
| | | | | 398/130 |
| 2021/0391923 | A1* | 12/2021 | Schneider | H04B 10/501 |

OTHER PUBLICATIONS

Sackinger, Eduard, Broadband Circuits for Optical Fiber Communication, 2002 (Year: 2002).*

* cited by examiner

ROTATABLE OPTICAL SHORT-RANGE TRANSCEIVER

CROSS-REFERENCE TO RELATED APPLICATION

This application claims priority from German Utility Model No. 20 2019 106 231.2, filed Nov. 8, 2019, which is incorporated herein by reference in its entirety.

BACKGROUND OF THE INVENTION

The present invention relates to the field of signal transmission, in particular to the optical data transmission via two components which are arranged to be rotatable to each other. Embodiments relate to a rotatable optical short-range transceiver for optical wireless data transmission.

Different approaches for allowing signal transmission are known in conventional technology, for example data transmission between two components which are arranged to be rotatable to each other. Either, both components are supported to be rotatable or one of the components is arranged to be rotatable relative to the other one. Conventional approaches solve the problem of data transmission via two mutually rotatable components by using cables, wherein slip rings or contact brushes are used for transmitting the electrical signals at the position of rotation. Such contact-entailing signal transmission approaches are of disadvantage since, due to the contact-entailing transmission technology, the lifetime of the position of rotation and, consequently, the lifetime of the entire system is reduced or limited, in particular due to contact wearing. In addition, the all-around signal propagation of the electrical signal on the slip ring causes multipath propagation, which may result in run time differences of the individual electrical signals, which may cause a limitation of the transmission bandwidth.

Other approaches known in conventional technology for avoiding the disadvantages of contact-entailing transmission technologies when transmitting signals via a position of rotation use optical wireless data transmission using optical transmission/reception units or transceivers provided in the components which are arranged to be rotatable relative to one another. This optical approach is of advantage in that there is no wear and, consequently, the lifetime of the entire system is not limited. In addition, multipath propagation of the signal as mentioned above is avoided so that a limitation of the transmission bandwidth using such optical wireless data transmission systems is avoided, thereby achieving data rates of up to 100 Mbit/s and more, for example.

FIGS. 1A and 1B shows a schematic illustration of a conventional signal transmission device comprising two optical wireless transmission/reception units, FIG. 1A representing a position of the two optical transmission/reception units with an intact data link between the same and FIG. 1B representing the two transmission/reception units twisted relative to each other, the result being an interruption in the data link.

FIG. 1A shows first transmission/reception means 100a comprising an optical transmitter 102a and an optical receiver 104a. In FIG. 1A, a rotation axis 106 is also illustrated around which the first transmission/reception unit 100a can be rotated. The optical transmitter 102a and the optical receiver 104a are arranged to be spaced apart from the rotation axis 106 in the transmission/reception unit 100a. For optical data transmission, the optical transmitter 102a generates a first transmission beam 108a which is directed towards a second transmission/reception unit 100b. The second transmission/reception unit in turn comprises an optical transmitter 102b and an optical receiver 104b which are arranged on both sides to the rotation axis 106. The second transmission/reception unit is arranged to be rotatable around the rotation axis 106, as is indicated by the arrow 106b. In the example illustrated in FIG. 1A, the two transmission/reception units 100a, 100b are oriented relative to each other such that the optical transmitter 102a in the first transmission/reception unit 100a is opposite the optical receiver 104b in the second transmission/reception unit 102b and that the optical transmitter 102b of the second transmission/reception unit 100b is arranged opposite the optical receiver 104a in the first transmission/reception unit 100a. The transmission beams 108a and 108b emitted by the optical transmitters 102a and 102b, respectively, are directed towards the opposite optical receivers 104b and 104a, respectively. When the two transmission/reception units 100a, 100b are oriented in correspondence with the illustration in FIG. 1A, bidirectional data transmission or unidirectional data transmission when using only one of the optical transmitters is possible. In other words, the data link between the two transmission/reception units 100a, 100b is intact.

The disadvantage of the conventional device for optical wireless data transmission via a position of rotation, as illustrated in 1A, is that the corresponding transmitters/receivers of the two rotatable or mutually twistable transceiver units are to be oriented to one another so that, in other words, the transmitter and the receiver are in visual contact. However, when the transmission/reception units 100a, 100b are twisted from the position as illustrated in FIG. 1A, for example when rotating the first transmission/reception unit 100a relative to the second transmission/reception unit 100b by 180°, for example, as is illustrated in FIG. 1B, the transmitter and the receiver are no longer opposite each other. Rather, as can be recognized, the corresponding transmitters and the corresponding receivers in the two transmission/reception units 100a, 100b are arranged to be opposite. In other words, there is no visual contact between the transmitters and the receivers in the two opposite transmission/reception units, or visual contact disappears, so that the data link will be interrupted.

U.S. Pat. No. 4,401,360 A describes an optical slip ring for optical communication between a pair of elements which can be rotated freely relative to each other. These elements may be a pair of optical fibers, an electrical conductor and an optical fiber or a pair of electrical conductors. One element is attached to a first mounting device and the other element is mounted to a second mounting device. The optical receiver is positioned in the center of the first mounting device on a common rotation axis relative to the second mounting device. The other optical receiver is arranged on the second mounting device on the common rotation axis. An optical emitter is attached to the first mounting device eccentrically and the other optical emitter is mounted to the second mounting device eccentrically. The optical transmitter mounted to the first mounting device is directed towards the optical receiver mounted to the second mounting device and the optical transmitter mounted to the second mounting device is directed towards the optical receiver mounted to the first optical device.

Starting from the conventional technology described above, the object underlying the present invention is providing an improved and compact rotatable optical short-range transceiver allowing reliable data transmission irrespective of a relative rotation position relative to another transmission/reception unit.

SUMMARY

According to an embodiment, a rotatable optical short-range transceiver may have: a support which is rotatable around a rotation axis, an optical receiver which is arranged at the support on the rotation axis to receive an optical reception signal from a first direction, an optical transmitter which is arranged at the support to be adjacent to the optical receiver to emit an optical transmission signal in a second direction, and an optical transmission/reception unit which is configured to allow interruption-free rotatable optical data communication, wherein the optical transmission/reception unit is arranged at the support above the optical receiver and extends over the optical receiver and the optical transmitter, wherein the optical transmission/reception unit has a support structure for mounting at the support, which is implemented integrally with the optical transmission/reception unit.

The inventors have realized that the problem of data interruption in a conventional signal transmission device comprising two optical wireless transceivers or transmission/reception units occurs particularly when the distance d between the two transmission/reception units or transceivers is in the order of magnitude of the transceiver size, for example when the distance is smaller than a radius of the transmission/reception units. Such short dimensions of the distance d occur, for example, in applications in which a data link between printed circuit boards (PCBs) is to be provided, or when using the device of FIGS. 1A and 1B as an optical slip ring replacement in rotating machine parts. In other words, the small distance of the transmission/reception units results in the transmission beam emitted by the corresponding optical transmitters not to be widened sufficiently to reach the corresponding receiver of the opposite transmission/reception unit when the transmission/reception units are twisted relative to one another, the result being the situation illustrated in FIG. 1B, which, when rotating the components where the corresponding transmission/reception units 100a, 100b are arranged, relative to one another, results in interruptions in the data link so that a continuous data link between the two components via the conventional device shown in FIGS. 1A and 1B cannot be ensured.

The present invention is based on the finding that the problem discussed above in conventional rotatable optical short-range transceivers for optical wireless data transmission is the arrangement of the optical transmitter and the optical receiver. In transmission/reception units, as are discussed referring to FIGS. 1A and 1B, the optical transmitter comprises a light source and the radiation profile of the transmission beam is shaped by transmission optics. The optical receiver exemplarily comprises a photodiode to which in turn special reception optics is associated to collect the received transmission beam, i.e. the received light signal. These two fundamental components of the rotatable optical short-range transceiver are arranged next to each other, as is discussed referring to FIGS. 1A and 1B, so that the rotation axis is between the two units, i.e. the transmitter and the receiver. As has been discussed before, the result of this implementation is that, with a small distance between the two transceivers when compared to the size of the transceiver, rotation of the elements relative to each other is not possible at all or only to a small extent since too large a twisting or rotation of the two transceivers relative to each other results in an interruption of transmission since the transmitter and the receiver in the corresponding transceivers can no longer see one another.

In order to solve this problem, the present invention suggests a rotatable optical short-range transceiver where the conventional arrangement of transmitter and receiver and the conventional provision of separate reception and transmission optics are overcome and, instead, a special optics design is provided which connects the reception optics and the transmission optics with each other, thereby allowing an arrangement of optical transmitter and optical receiver which ensures reliable data transmission between two transmission/reception units irrespective of how they are twisted relative to each other. An optical transmission/reception unit is provided, configured to allow interruption-free rotatable optical data communication, arranged at a support above the optical receiver, and comprising a support structure for mounting at the support which is implemented integrally with the optical transmission/reception unit.

The present invention provides a rotatable optical short-range transceiver comprising:
  a support which is rotatable around a rotation axis,
  an optical receiver which is arranged at the support on the rotation axis to receive an optical reception signal from a first direction,
  an optical transmitter which is arranged at the support to be adjacent to the optical receiver to emit an optical transmission signal in a second direction, and
  an optical transmission/reception unit which is configured to allow interruption-free rotatable optical data communication,
  wherein the optical transmission/reception unit is arranged at the support above the optical receiver and extends over the optical receiver and the optical transmitter,
  wherein the optical transmission/reception unit comprises a support structure for mounting at the support, which is implemented integrally with the optical transmission/reception unit.

In accordance with embodiments the optical transmission/reception unit and the support structure are implemented integrally as one component or are integrated in one component.

In accordance with embodiments the optical transmission/reception unit comprising the support structure is manufactured by optical injection molding, optical 3D printing or mechanical precision milling.

In accordance with embodiments the optical transmission/reception unit is placed on the support, wherein the optical transmission/reception unit comprising the support structure forms a component envelope together with the support.

In accordance with embodiments the support comprises a printed circuit board, PCB, for example, or a chip package, like a Quad Flat No Leads, QFN, Package, a Quad Flat, QFP, Package, a Small Outline Transistor, SOT, Package or a Dual In-Line, DIL, Package.

In accordance with embodiments the support comprises one or more electrical components apart from the optical receiver and the optical transmitter, and the optical receiver, the optical transmitter and the one or more electrical components are electrically connected by conductive traces and/or bonds.

In accordance with embodiments the optical receiver comprises a photodiode, PD, and the one or more electrical components, comprise at least one amplifier, like a transimpedance amplifier followed by one or more limitation amplifiers, downstream of the photodiode and amplifying the reception signal.

In accordance with embodiments the optical transmitter comprises a laser diode, LD, and the one or more electrical components comprise a laser driver unit for controlling the laser diode.

In accordance with embodiments the support comprises a plurality of electrical connections to the outside, for example in the form of terminal pins, and the optical receiver, the optical transmitter and the one or more electrical components are electrically connected to the electrical connections to the outside by conductive traces and/or bonds.

In accordance with embodiments the rotatable optical short-range transceiver can be soldered onto a board and be integrated in a system or machine to allow optical rotatable short-range data communication.

In accordance with embodiments the optical transmission/reception unit comprises transmission/reception optics arranged at the support on the rotation axis above the optical receiver and extending over the optical receiver and the optical transmitter, the transmission/reception optics comprising reception optics and transmission optics arranged in the reception optics,
- wherein the reception optics is configured to direct the optical reception signal impinging on the transmission/reception optics in the direction of the optical receiver on the rotation axis, and
- wherein the transmission optics is configured to shift the optical transmission signal emitted by the optical transmitter to the rotation axis so that a transmission beam leaves the transmission/reception optics in the region of the rotation axis.

In accordance with embodiments the transmission optics shifts the optical transmission signal emitted by the optical transmitter to the rotation axis such that the transmission beam leaves the transmission/reception optics centrally.

In accordance with embodiments the transmission optics shifts the optical transmission signal emitted by the optical transmitter to the rotation axis 206 such that the transmission beam is basically parallel to the rotation axis.

In accordance with embodiments the transmission optics is formed by a first portion of a surface of the reception optics facing the optical receiver and by a second portion of a surface of the reception optics facing away from the optical receiver,
- wherein the first portion is configured to deflect the optical transmission signal emitted by the optical transmitter in the direction to the rotation axis and direct the same onto the second portion, and
- wherein the second portion is configured to deflect the optical transmission signal received from the first portion in a direction parallel to the rotation axis.

In accordance with embodiments the reception optics comprises a first reception area on the surface of the reception optics facing the optical receiver and a second reception area on the surface of the reception optics facing away from the optical receiver,
- wherein the first reception area and the second reception area are implemented as spherical, aspherical or free-form optics.

In accordance with embodiments the first reception area and the second reception area are implemented differently.

In accordance with embodiments the optical transmission/reception unit comprises transmission/reception optics arranged at the support on the rotation axis above the optical receiver and extending over the optical receiver and the optical transmitter, wherein the transmission/reception optics comprises reception optics and transmission optics arranged in the reception optics,
- wherein the reception optics is configured to direct the optical reception signal impinging on the transmission/reception optics in the direction of the optical receiver on the rotation axis, and
- wherein the transmission optics is arranged above the optical transmitter and is configured to shape the optical transmission signal emitted by the optical transmitter to form an output beam.

In accordance with embodiments the transmission optics is arranged at least partly in the reception optics, wherein a portion of the transmission optics facing the optical transmitter forms a first beam-shaping area for shaping the optical transmission signal, wherein the first beam-shaping area
- is formed at least partly in a surface of the reception optics facing the optical receiver, or
- protrudes at least partly beyond the surface of the reception optics facing the optical receiver or is recessed relative thereto.

In accordance with embodiments the transmission optics is arranged at least partly in the reception optics, wherein a portion of the transmission optics facing away from the optical transmitter forms a first beam-shaping area for shaping the optical transmission signal, wherein the first beam-shaping area
- is formed at least partly in a surface of the reception optics facing away from the optical receiver, or
- protrudes at least partly beyond the surface of the reception optics facing away from the optical receiver or is recessed relative thereto.

In accordance with embodiments the transmission optics is arranged at least partly in the reception optics,
- wherein a portion of the transmission optics facing the optical transmitter forms a first beam-shaping area for shaping the optical transmission signal, wherein the first beam-shaping area
- is formed at least partly in a surface of the reception optics facing the optical receiver, or
- protrudes at least partly beyond the surface of the reception optics facing the optical receiver or is recessed relative thereto, and
- wherein a portion of the transmission optics facing away from the optical transmitter forms a second beam-shaping area for shaping the optical transmission signal, wherein the second beam-shaping area
- is formed at least partly in a surface of the reception optics facing away from the optical receiver, or
- protrudes at least partly beyond the surface of the reception optics facing away from the optical receiver or is recessed relative thereto.

In accordance with embodiments the surface of the reception optics facing the optical receiver is divided into two portions by the portion of the transmission optics facing the optical transmitter such that the surface of the reception optics facing away from the optical receiver and the two portions of the surface of the reception optics facing the optical receiver direct the optical reception signal impinging on the reception optics in the direction to the optical receiver on the rotation axis.

In accordance with embodiments the surface facing the optical receiver and/or the surface of the reception optics facing away from the optical receiver comprise/comprises a certain surface structure so that regions between the reception optics and the support not illuminated due to the transmission optics arranged in the reception optics are illuminated.

In accordance with embodiments the surface facing the optical receiver and/or the surface of the reception optics facing away from the optical receiver is/are provided with a layer with a certain surface structure so that regions between the reception optics and the support not illuminated due to the transmission optics arranged in the reception optics are illuminated.

In accordance with embodiments the transmission optics is integrated in the reception optics.

In accordance with embodiments the support comprises a support surface from which the rotation axis extends perpendicularly.

In accordance with embodiments the optical receiver and the optical transmitter are arranged on the support surface, or the optical receiver and the optical transmitter are arranged at the support surface at equal or different distances from the support surface.

In accordance with embodiments the rotatable optical short-range transceiver comprises at least one further optical transmitter arranged at the support to be adjacent to the optical receiver, wherein the transmission/reception optics comprises at least one further transmission optics integrated in the reception optics.

In accordance with embodiments a wavelength of the optical reception signal and the optical transmission signal is in the ultraviolet range, visible range or infrared range.

BRIEF DESCRIPTION OF THE DRAWINGS

Embodiments of the present invention will be discussed below in further detail referring to the drawings, in which.

DETAILED DESCRIPTION OF THE INVENTION

Figure 1:
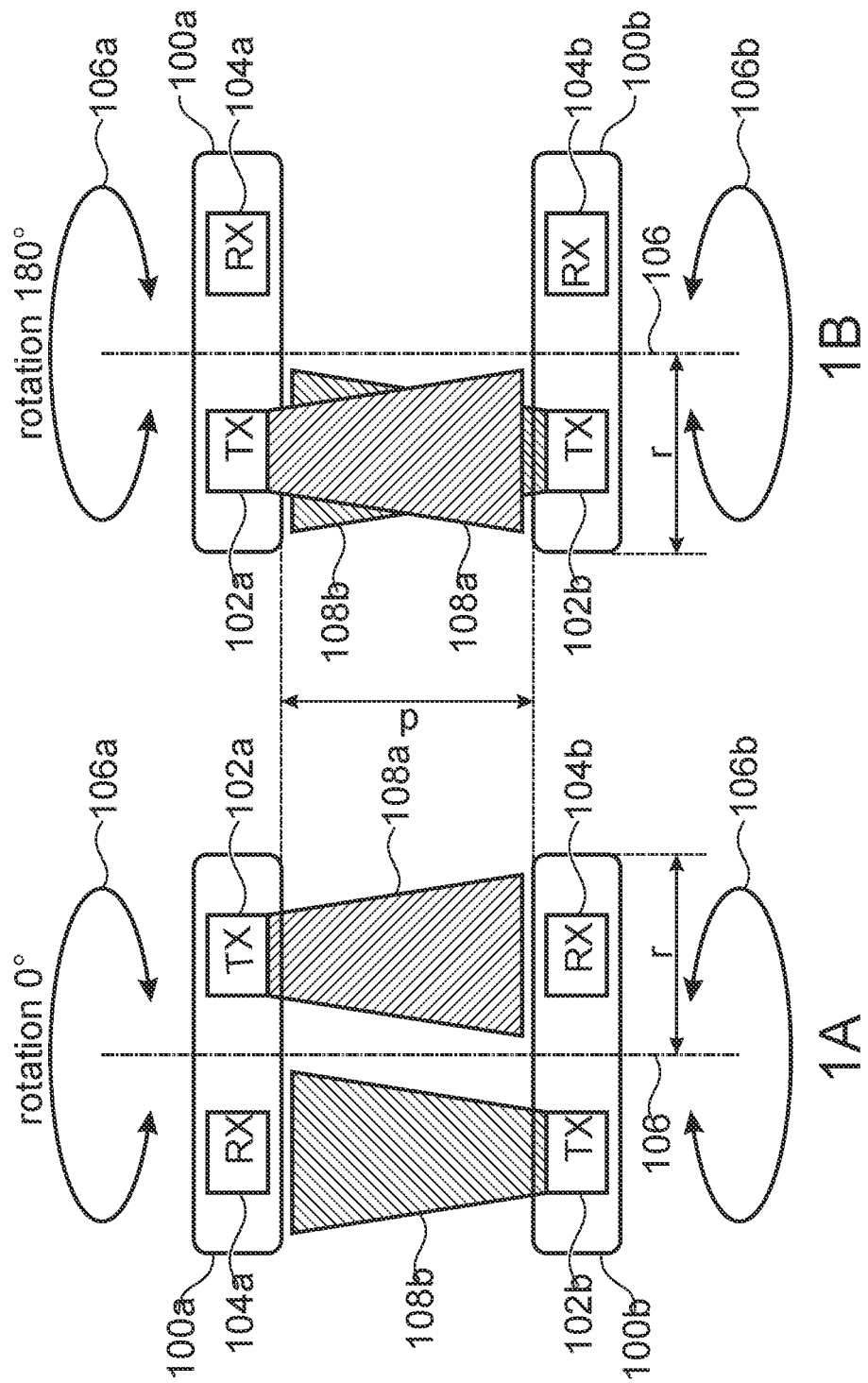
FIGS. 1A and 1B shows a schematic illustration of a conventional signal transmission device comprising two optical wireless transmission/reception units, FIG. 1A illustrating a position of the two optical transmission/reception units with an intact data link between the same, and FIG. 1B illustrating the two transmission/reception units twisted relative to each other so that the data link is interrupted.

In the following description of embodiments of the present invention, equal elements or elements of equal effect are provided with equal reference numerals in the figures.

In accordance with embodiments, a rotatable optical short-range transceiver is provided, comprising complex optics configured to allow an interruption-free rotatable optical data communication. The optics can, for example, be implemented in the form of an optical transmission/reception unit in correspondence with one of the embodiments described below. In accordance with embodiments, a transmission part and a reception part of the optics are integrated with each other and the complex optics obtained in this way is supplemented by a hold part or support structure produced integrally with the transmission part or transmission optics and the reception part or reception optics. This means that the optics consist of the optical transmission/reception unit with the hold part, or the transmission part, the reception part and the hold part. This complex component is produced as one component, for example by optical injection molding, optical 3D printing, mechanical precision milling or other suitable related processes.

The optics formed in this way is arranged on the support and, together with it, forms the component envelope or component housing. The support can, for example, be a printed circuit board, PCB, or a chip package. Examples of chip packages are Quad Flat No Leads, QFN, Package, Quad Flat, QFP, Package, Small Outline Transistor, SOT, Package or Dual In-Line, DIL, Package. The chip package can contain semiconductor chips which can be connected to transmission/reception electronics, for example, to provide for data processing by means of which data to be transmitted are processed, for example encrypted, for transmission, or by means of which received data are processed, for example decrypted.

As has already been mentioned before briefly, the optical and, maybe, further electrical components of the transceiver are applied on the support and connected to one another. The optical components comprise a photodiode, PD, and a laser diode, LD, for example. The PD is located on the rotation axis of the optics and the LD is arranged next to it so that the optics can shift the transmission beam to the rotation axis. The LD can be controlled by a laser driver and the LD and the driver together form a transmission unit. Downstream of the PD, there is an amplifier which amplifies the reception signal. The amplifier can be a transimpedance amplifier, for example followed by one or more limitation amplifiers.

The optical and electrical components are connected to one another by bonding or conductive traces. Additionally, the support comprises terminals, also referred to as pins, providing for an external electrical connection.

Like other electrical components, the transceiver can be soldered to a board, for example, and be integrated or installed in a system or machine to allow optical rotatable short-range data communication (data transmission/data reception).

Figure 2:
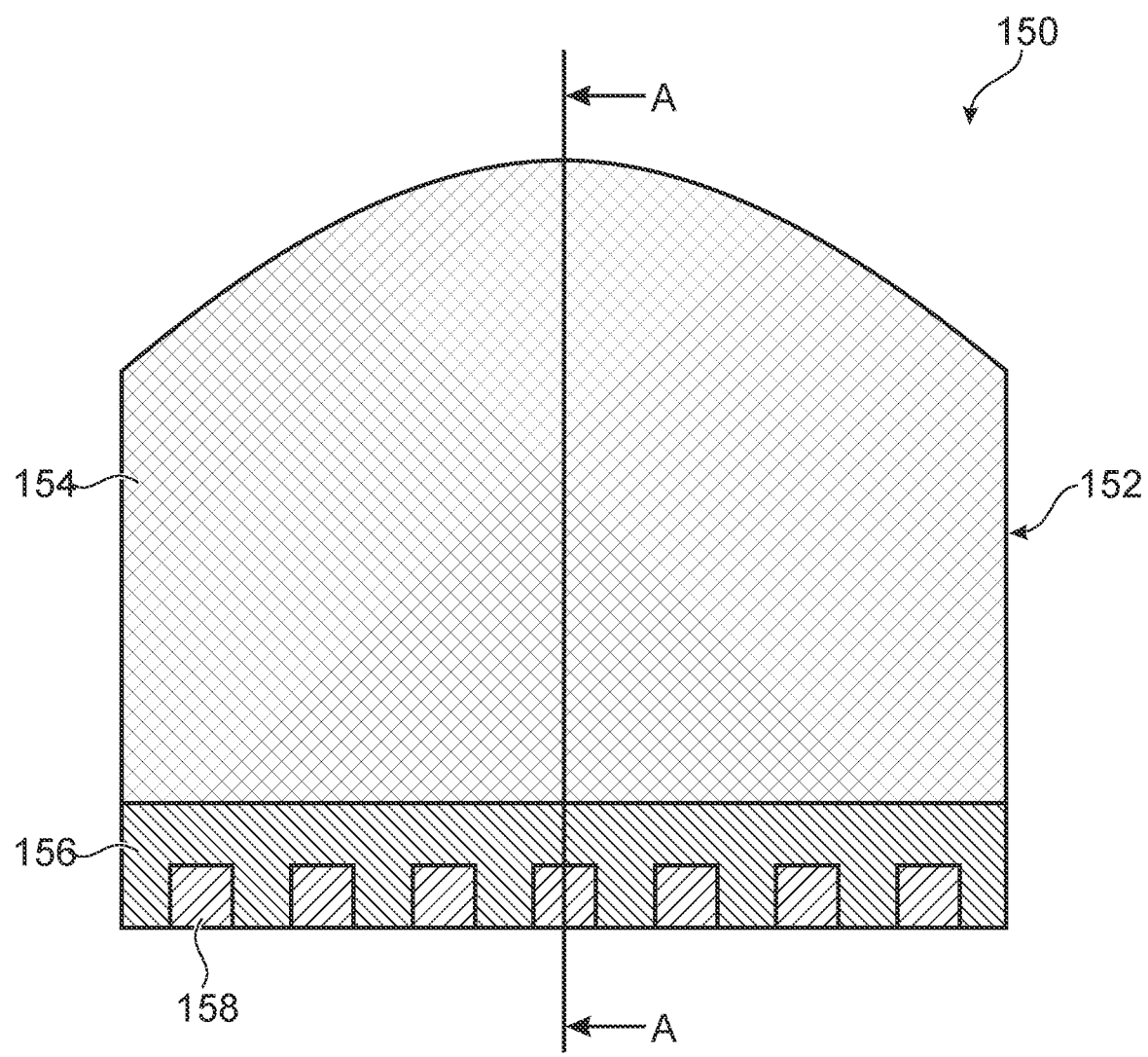
FIG. 2 shows a lateral external view of a rotatable optical short-range transceiver in accordance with embodiments of the present invention.

FIG. 2 is a lateral external view of a rotatable optical short-range transceiver in accordance with embodiments in which the optical transmission/reception unit comprises a support structure implemented integrally with the optical transmission/reception unit. In top view, the illustrated rotatable optical short-range transceiver 150 can comprise a round or multi-corner cross section and the support structure 154 implemented integrally with the optical transmission/reception unit 152 forms an external envelope of the transceiver 150. In addition, FIG. 2 shows that the optical transmission/reception unit 152 is arranged on the support 156 such that the support 156 and the optical transmission/reception unit 152 form a casing for the components arranged on the support. Additionally, in FIG. 2, the external terminals or pins 158 of the support 156 are illustrated, by means of which the transceiver 150 can, for example, be soldered to the board or installed in a system or machine.

Figure 3:
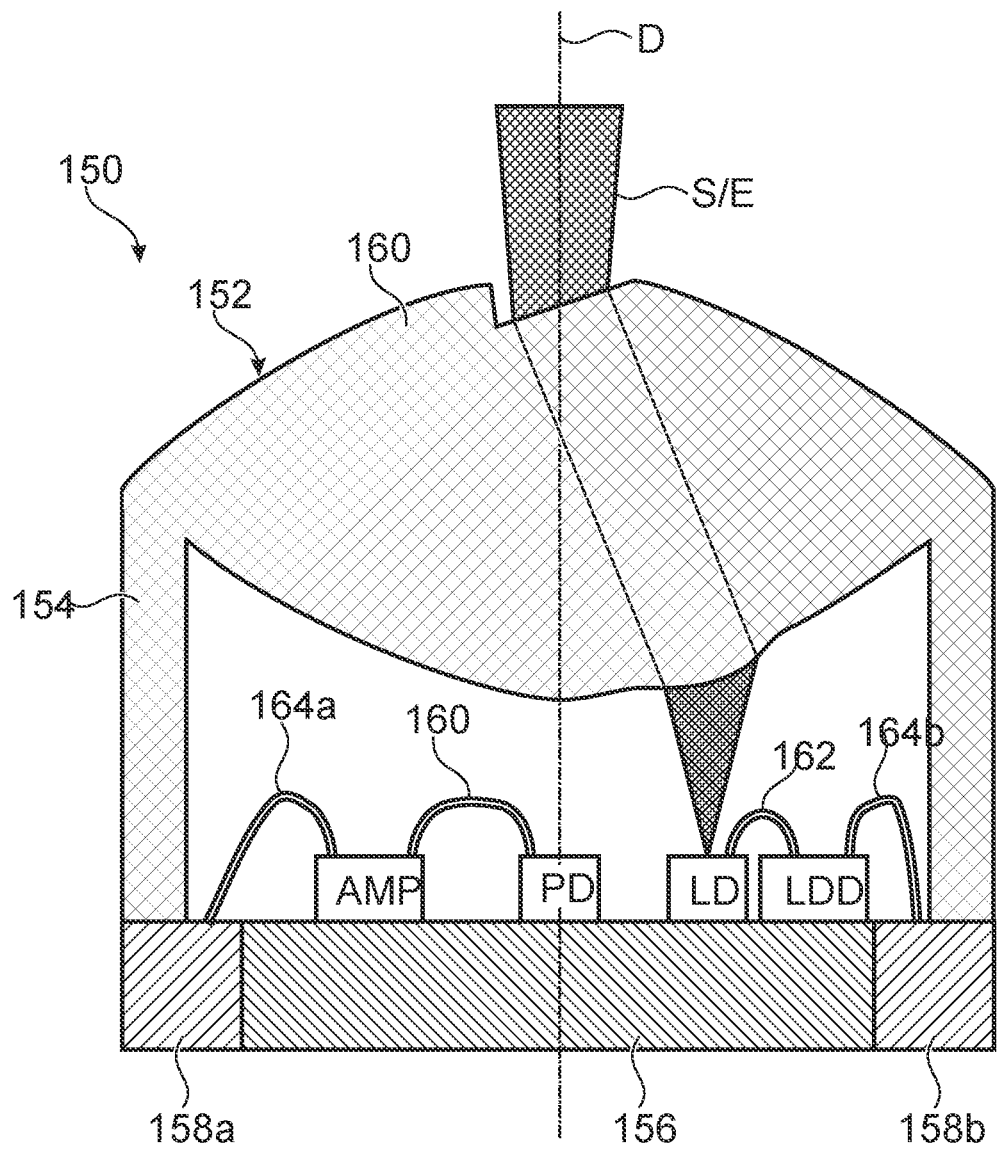
FIG. 3 shows a sectional view of the transceiver illustrated in FIG. 2 along the line A-A in FIG. 2.

FIG. 3 is a sectional view of the transceiver 150 illustrated in FIG. 2 along the line A-A in FIG. 2. The optical transmission/reception unit 152 illustrated in FIG. 3 comprises transmission/reception optics 160 and the support structure 154 which, together with the support 156, form the component envelope which encloses the optical components applied on the support 156 and further electrical components. In the illustrated embodiment of the transceiver, the optical components comprise the laser diode LD and photodiode PD mentioned already. A laser driver LDD controlling the laser diode LD is associated to the laser diode LD. An amplifier AMP which amplifies the reception signal is positioned downstream of the photodiode PD. The amplifier AMP can be a transimpedance amplifier followed by one or more limitation amplifiers.

The optical and electrical components are connected to one another by the bonds 160, 162. The support 156 comprises the terminals 158, also referred to as pins, which provide an external electrical connection. The terminal 158a is connected to the amplifier AMP by a bond 164a and the terminal 158b is connected to the laser driver LDD by a bond 164b.

The complex optics illustrated in FIG. 3 allows an interruption-free rotatable optical data communication since the transmission and reception signals S/E can propagate along the rotation axis D, irrespective of a rotation position of the transceiver. The optics are implemented such that reception signals received along the rotation axis are directed to the photodiode and that transmission signals from the laser diode are deflected such that they propagate along the rotation axis. Here, the optical transmission/reception unit 152 can comprise the transmission/reception optics 160 illustrated in FIG. 3 or differently implemented transmission/reception optics with a corresponding function. Embodiments for implementing the transmission/reception optics 160 will be discussed below in greater detail.

Figure 4:
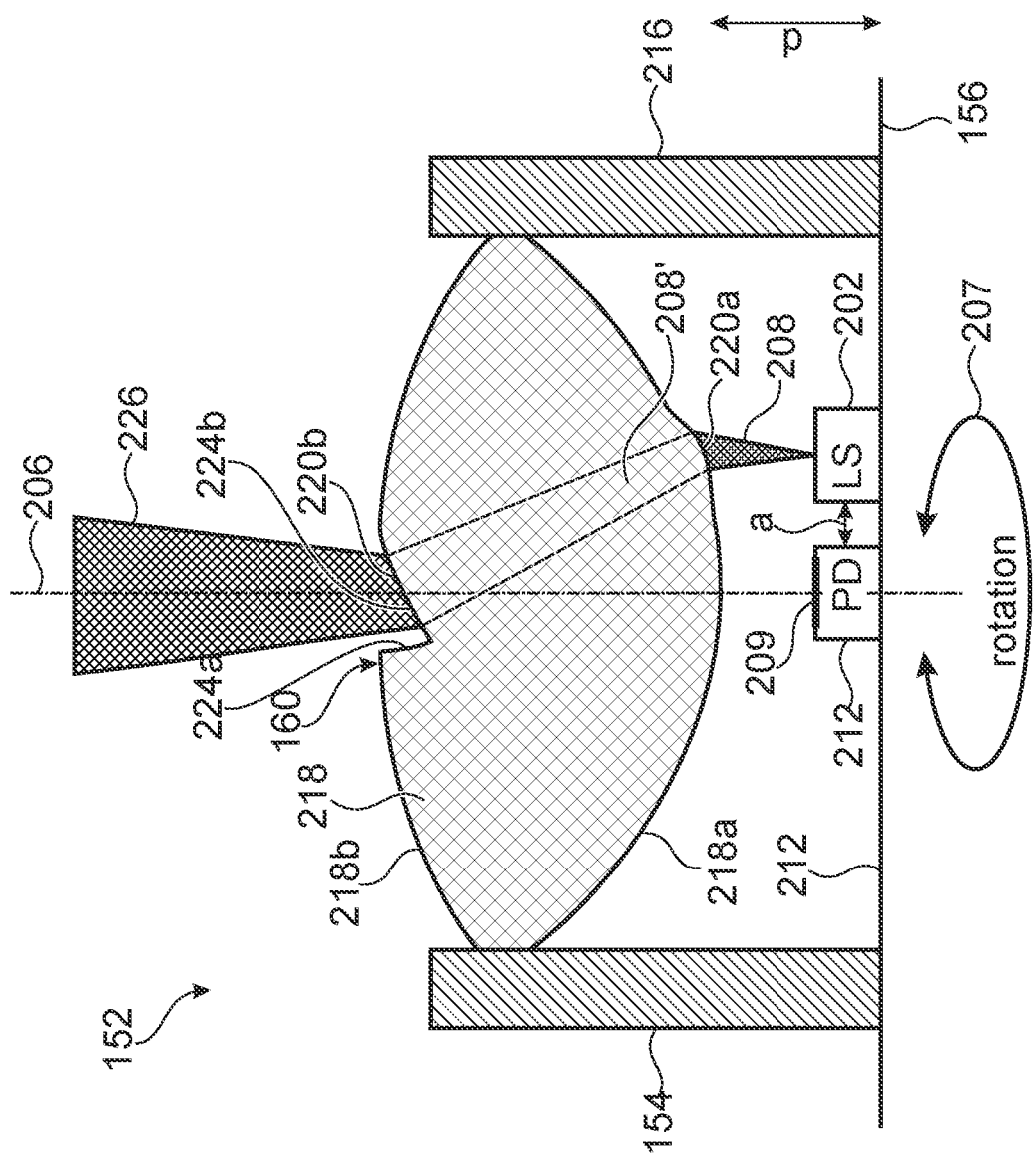
FIG. 4 shows the setup of a transmission/reception unit of a rotatable optical short-range transceiver in accordance with an embodiment of the present invention.

FIG. 4 shows the setup of a transmission/reception unit in accordance with an embodiment of the present invention, as is described, for example, in the German patent application DE 2019 202 766. The transmission/reception unit 152 comprises an optical transmitter 202 and an optical receiver 204. The transmission/reception unit 152 is arranged to be rotatable around the rotation axis 206, as is indicated by the arrow 207. Additionally, the transmission beam 208 provided by the optical transmitter 202 is illustrated in FIG. 4.

The optical receiver 204 is arranged such that its position matches a position of the rotation axis 206. The optical receiver 204 receives an optical receive signal from a first direction and the optical transmitter 202 transmits an optical transmission signal in a second direction which is basically opposite to the first direction. In the illustrated embodiment, the optical receiver 204 which can, for example, be formed by a photodiode, PD, comprises an active area 209 for receiving incident light. The receiver 204 is arranged in the region of the rotation axis 206 such that the rotation axis 206 is centrally on the active area 209 and perpendicular thereto. In the illustrated embodiment, the transmission/reception unit or transceiver 152 comprises a support 156 and in the illustrated embodiment both the optical transmitter 202 and the optical receiver 204 are arranged on a surface 212 of the support. The optical transmitter 202 is arranged to be offset to the rotation axis 206 and spaced apart from the optical receiver 204. In other words, relative to the rotation axis 206, the optical receiver 204 is arranged centrally on the support 156 and the optical transmitter 206 is arranged eccentrically relative to the rotation axis 206 on the support 156. The distance a between the optical receiver 204 and the optical transmitter 202 can, in accordance with embodiments, depend on the system design.

Additionally, the transmission/reception unit 152 comprises transmission/reception optics 160 which is arranged to be spaced apart from the support surface 212 and, thus, spaced apart from the optical transmitter 202 and the optical receiver 204. The transmission/reception unit 152 comprises a support structure 154 for mounting the transmission/reception optics 160. The support structure 154 is arranged on the support surface 212 of the support 156 and extends, as is illustrated in FIG. 4, upwards so that the transmission/reception optics is arranged to be spaced apart from the support surface 212. In accordance with an embodiment, the transmission/reception optics is arranged at a distance d from the surface 212 of the support 156. The distance is, for example, determined by the radiation angle of the transmitter in order for the area 220a not to become too large, which usually is smaller than the radius of the optics 160 and can reach/extend up to shortly before the source. The distance d can be in a range between the lower threshold just mentioned and the diameter of the optics 160. As is illustrated in FIG. 4, the distance d is measured along the rotation axis 208 from the support surface 212 to the optics 160.

According to the invention, the transmission/reception optics 160 comprises reception optics 218 and transmission optics arranged within the reception optics 218. In other words, the transmission/reception optics is formed primarily by the reception optics 218 arranged on the rotation axis 206 and extends over both the optical receiver 214 and the optical transmitter 202. The transmission optics comprises a first portion 220a arranged on a first surface 218a of the reception optics 218 facing the optical receiver 204. In the embodiment illustrated in FIG. 4, the first portion 220a of the transmission optics is formed by a portion of the reception optics 218 arranged above the optical transmitter 202 and implemented to be convex relative to the first surface 218a of the reception optics. Additionally, the transmission optics comprises a second portion 220b which is arranged on a second surface 218b of the reception optics 218 facing away from the optical receiver 204. In the illustrated embodiment, the second portion 220b of the transmission optics is formed by a convex recess in the surface 218b in the region of the rotation axis 206. The convex portion 220b comprises a first surface 224a and a second surface 224b. The first surface 224a extends, adjacent to the rotation axis

206, basically perpendicular to the surface 212 of the support 156 and in parallel to the rotation axis 206 into the reception optics 218 and merely is a linking area for connecting the transmission and reception areas, but is of no optical use. A second surface 224b extends from the lower end of the first surface 224a, i.e. from that end of the first surface 224a spaced apart from the surface 218b, to the surface 218b of the reception optics 218. The second surface 224b extends, relative to the surface 212 of the carrier 156, in an angle in the second direction in which the optical signal 208 is radiated from the optical signal source 202. In accordance with embodiments, the angle is larger than 0° and smaller than a total reflection angle of the material used, i.e. of the material of the transmission/reception optics. The angle can be between 30° and 45° and, in accordance with an embodiment, is approximately 42°. In the embodiment illustrated in FIG. 4, the second surface 224b of the second portion 220b of the transmission optics is implemented to be curved convexly.

The first surface 218a of the reception optics 218 facing the optical receiver 204 is also referred to as first reception area and the second surface 218b of the reception optics 218 facing away from the optical receiver 204 is also referred to as second reception area. In accordance with embodiments, the first reception area and/or the second reception area are implemented as spherical, aspherical or free-form optics.

The transmission beam 208 radiated from the optical transmitter 202 impinges on the first portion 220a of the transmission optics, causing a deflection of the beam in the direction towards the second portion 220b in the direction of the rotation axis 206, as is illustrated in FIG. 4 by the deflected beam 208'. The beam 208' impinges on the second portion 220b of the transmission optics, more precisely on the second surface 224b, which in turn causes deflection of the beam 208' in the direction of the rotation axis 206, resulting in an output beam 226 propagating basically along the rotation axis 206. In other words, in accordance with the invention, transmission optics is provided, comprising the first portion 220a, which is also referred to as first transmission area, and the second portion 220b, which is also referred to as second transmission area, the two transmission areas 220a, 220b being integrated in the reception optics 218 such that the output beam 226 is shifted onto the rotation axis 206, meaning that the transmission beam 208, 208' leaves the transmission/reception optics 160 basically in the center or centrally. The transmission beam 208 is tilted by the first transmission area 220a in the direction of the rotation axis 206 and directed onto the second transmission area 220b which is formed or arranged to be centrally on the top face 218b of the transmission/reception unit 160. The second transmission area 220b in turn tilts the deflected transmission beam 208' in the direction of the rotation axis, the result being the output beam 226 arranged in parallel to the rotation axis 206. The inventive implementation results in the light source 202 and the photodiode 204 to appear virtually on the rotation axis 206, thereby allowing a 360° rotation of the application 152 without interrupting the link. In accordance with embodiments, deviations from the parallelism to the rotation axis are possible so that the output beam 226 is basically parallel to the rotation axis 206.

In accordance with embodiments, the first transmission area 220a and the second transmission area 220b are formed by a planar area, which may be arranged to be parallel to each other to cause a lateral shift of the transmission beam 208 to generate the output beam 226 so that an optics design for a rotatable optical short-range transceiver for optical wireless data transmission in accordance with the plane-parallel board principle is provided. In accordance with other embodiments, the transmission areas 220a, 220b can be configured to be spherical, aspherical or free-form optics, which makes it possible to perform, apart from shifting mentioned above, additionally beam shaping of the transmission beam 208, 208' to obtain an output beam 226 of a desired shape. In accordance with still other embodiments, it may be provided for providing only one of the transmission areas 220a, 220b and realizing the function of the other transmission area by means of suitable shaping of the surfaces 218a and 218b of the reception optics 218 at least at those positions where the transmission beam 208, 208' is received.

In accordance with the invention, it is provided for integrating the reception optics 218 and the transmission optics 220 with each other such that the result is common or single transmission/reception optics or transceiver optics 160, wherein the reception optics 218 represents the largest part of the transmission/reception optics 160. As will be discussed below in greater detail, the inventive implementation of the transmission/reception unit allows providing a data transmission device for data transmission among mutually rotatable components with a rotatability for a 360° rotation even in the case of very small distances. This ensures a reliable and continuous data transmission and the problems occurring in conventional implementations of transmission/reception units, as were discussed before, are avoided. In accordance with the invention, it is provided for the electrical receiver element or optical receiver 204, which exemplarily comprises a photodiode, to be located on the rotation axis 206 and the reception optics 218 to also be located on the rotation axis 206 over the photodiode 204, as is illustrated in FIG. 4. The photodiode exemplarily comprises a PIN diode, an avalanche diode, a metal semiconductor metal diode or the like.

The light source or optical transmitter 202 is located eccentrically, i.e. spaced apart from the rotation axis 206, adjacent to the photodiode 204, i.e. in direct proximity thereto. The optical transmitter 202 can comprise a laser source, like a laser diode, LD, or an incoherent light source, like a light-emitting diode, LED.

FIG. 4 illustrates an embodiment in which the first portion 220a of the transmission optics is defined in that a portion of the lower surface 218a of the reception optics 218, opposite the light source 202, is implemented to be convex, whereas the second portion 220b of the transmission optics is formed by a recess in the top surface 218b of the transmission optics 218, wherein the recess is arranged centrally. The present invention is not limited to the implementation of the transmission/reception optics 160 in accordance with the embodiment illustrated in FIG. 4, rather, the transmission/reception unit can also be implemented differently. FIGS. 5A to 5D show further embodiments of the transmission/reception optics 160.

Figure 5C:
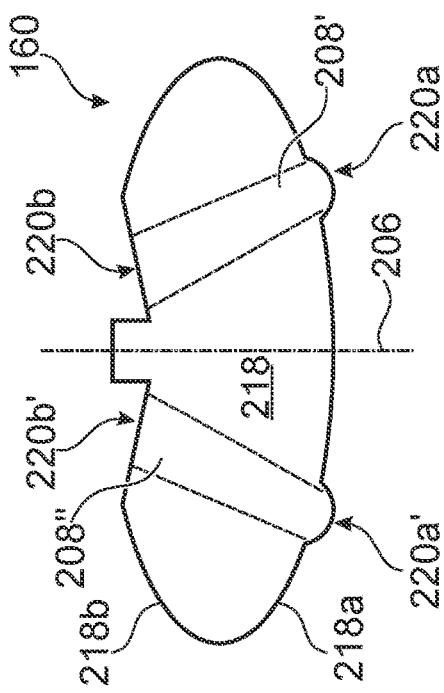
FIG. 5A-5D show different implementations for the transmission/reception optics of FIG. 4.
Figure 5D:
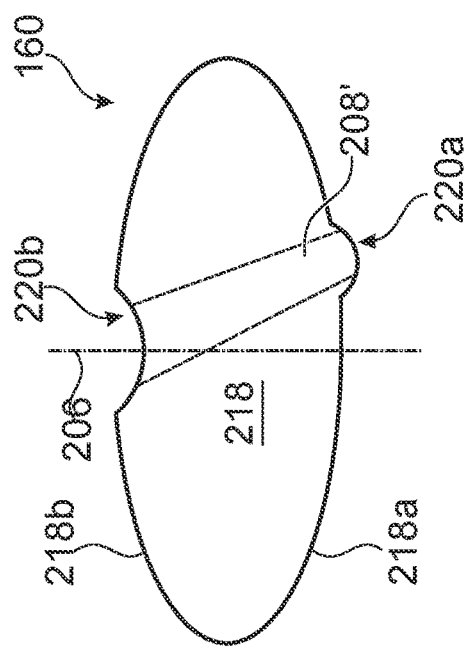
Figure 5A:
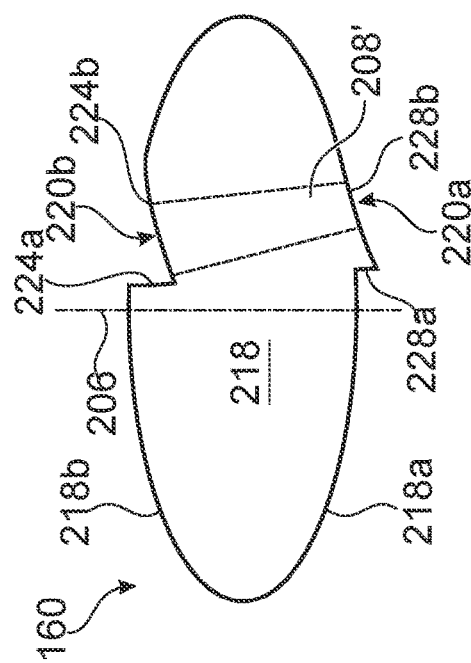

FIG. 5A shows an implementation of the transmission/reception optics 160 in which the second portion 220b is implemented as has been discussed referring to FIG. 4, however, the portion 220b of the transmission optics is no longer arranged centrally in the region of the reception optics 218, but laterally offset relative to the rotation axis 206. In the embodiment illustrated in FIG. 5A, the first portion 220a of the transmission optics is implemented similarly to the second portion 220b, i.e. by a first surface 228a which extends in parallel to the rotation axis 206 perpendicularly from the lower surface 218a of the reception optics 218. A second surface 228b extends from the lower end of the first surface 228a to the lower surface 218a of the reception optics 218. Similarly to the surface 224a mentioned above, the surface 228a also only is a linking area for connecting the transmission and the reception areas, but is of no optical use. Advantageously, the surfaces 224b and 228b of the two portions 220a, 220b of the transmission optics are oriented in parallel to each other so as to cause tilting of the transmission beam 208' in the direction of the rotation axis 206 and to generate the output beam 226 which extends along the rotation axis in direct proximity thereto or partly overlapping with the rotation axis 206 so that, in the embodiment illustrated in FIG. 5A, the light source 202 and the optical receiver 204 also virtually appear to be at least partly overlapping in a common region around the rotation axis 206.

Figure 5B:
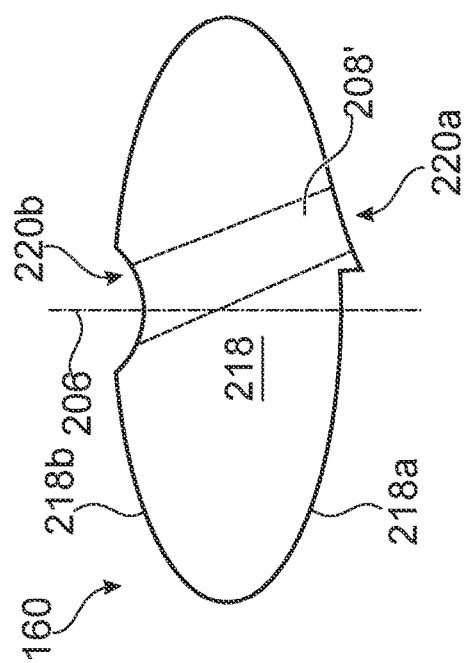

FIG. 5B shows another implementation of the transmission/reception optics 160 in which the first portion 228a of the transmission optics is implemented as has been discussed referring to FIG. 5A. The second portion 228b of the transmission optics is formed centrally by a convex recess in the upper surface 218b of the reception optics 218.

FIG. 5C shows another implementation of the transmission/reception optics 160 in which the transmission optics contains additional portions, for example when the arrangement 152 in accordance with FIG. 4 comprises additional light sources. In FIG. 5C, the respective portions 220a, 220a' and 220b, 220b' of the transmission optics are arranged to be offset to the rotation axis 206 and comprise a structure as has been discussed referring to FIG. 4.

FIG. 5D shows still another implementation of the transmission/reception optics 160 in which the first portion 220a of the transmission optics is implemented as has been discussed referring to FIG. 4, and the second portion 220b of the transmission optics is implemented as has been discussed referring to FIG. 5B.

In the embodiments described referring to FIG. 4 and FIGS. 5B to 5D, the first and/or the second portions 220b of the transmission optics are implemented to cause, in addition to the deflection of the transmission beam, beam forming to result in a desired shape of the output beam 226.

With regard to the embodiments described above as to the implementation or shaping of the two portions 220a, 220b of the transmission optics, it is pointed out that the respective implementations can also be combined in a different manner so that the present invention is not limited to the illustrated embodiments.

Figure 6:
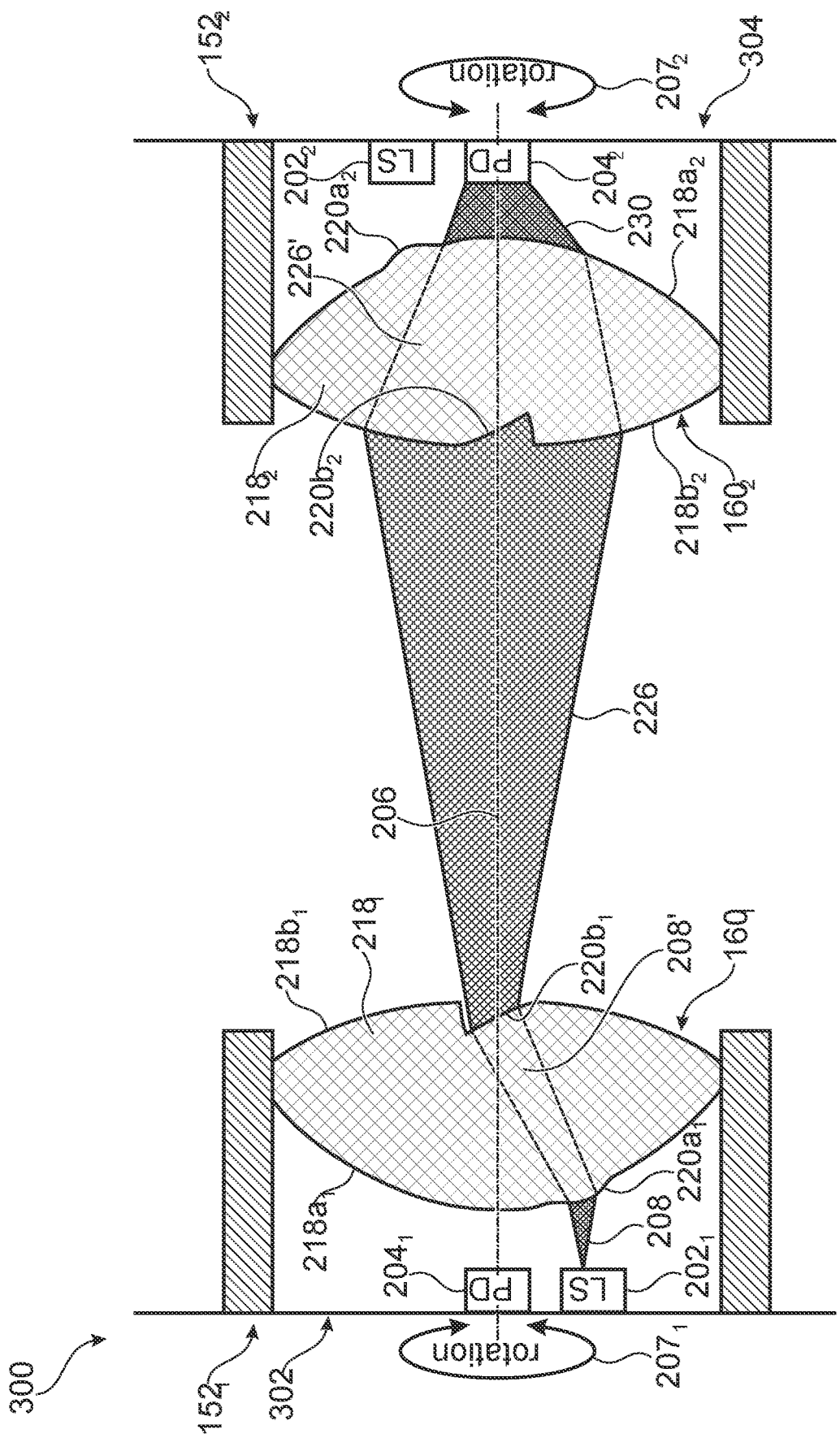
FIG. 6 shows an embodiment for signal transmission means which comprises two rotatable optical short-range transceivers arranged to be rotatable relative to each other in accordance with embodiments of the present invention which are each provided with a transmission/reception unit in accordance with FIG. 4.

Subsequently, embodiments of signal transmission using the inventive short-range transceivers, as have been discussed referring to FIGS. 4 and 5A-5D, for example, will be descried in greater detail. FIG. 6 shows an embodiment of signal transmission means 300 which comprises two components or short-range transceivers 302, 304, arranged to be mutually rotatable, in accordance with the present invention, which are each provided with a transmission/reception unit $152_1$ and $152_2$ in accordance with FIG. 4 so as to allow wireless optical data transmission between the two components 302, 304 arranged to be mutually rotatable. In FIG. 6, the elements, described referring to FIG. 4, of the transmission/reception unit $152_1$ are illustrated and the reference numerals are provided with the subscript "1" and not described again. Additionally, the transmission/reception unit $152_2$ associated to the second component 304, is illustrated and the corresponding components described referring to FIG. 4 are provided with the same reference numeral with the subscript "2" and not described again either. One or both transceivers can be rotated relative to each other permanently during data transmission.

FIG. 6 shows an exemplary data transmission from the first component 302 to the second component 304, i.e. a unidirectional link, wherein, in accordance with other embodiments, simultaneous transmission in both directions is also possible. As is illustrated in FIG. 6, the portions $220a_1$ and $220b_1$ of the transmission optics of the transmitting transmission/reception unit $152_1$ are implemented to shape the transmission beam 208 to form the output beam 226 such that the output beam 226 leaves the transmission/reception optics $160_1$ of the transmitting transmission/reception unit $152_1$ in a central region around the rotation axis and is directed to the transmission/reception optics $160_2$ of the receiving transmission/reception unit $152_2$ or illuminates the transmission/reception optics. In accordance with embodiments, the receiving transmission/reception unit $152_2$, which can also be referred to as reception transceiver, can be shifted from the optical Z axis, which matches the rotation axis 206, in the X direction and/or Y direction, wherein the degree of shiftability depends on the specific design of the transmission and reception optics. In accordance with embodiments, the offset can be between 0 and greater than a radius of the transmission/reception optics. The beam 226 provided by the transmission transceiver or the transmitting transmission/reception unit $152_1$ and directed to the reception optics $218_2$ is collected by the transceiver optics $160_2$ of the reception transceiver $152_2$ and guided or focused by the first reception area $218a_2$ and the second reception area $218b_2$ in the direction of the photodiode $204b$, wherein the region of the second portion $202b_2$ of the transmission optics cannot be used for focusing. The first portion $202a_2$ of the transmission optics is arranged to be spaced apart from the rotation axis 206 and has no influence on focusing. FIG. 6 shows the reception beam 230, generated by the transmission/reception optics $160_2$, which is focused on the photodiode $204_2$. In other embodiments, the first portion $202a_2$ is positioned in the used region of the reception area $218a_2$, which can result in a low and, thus, exactable reduction of the reception power. The beam redirected by the reception area $220b_2$ is not illustrated.

Figure 7:
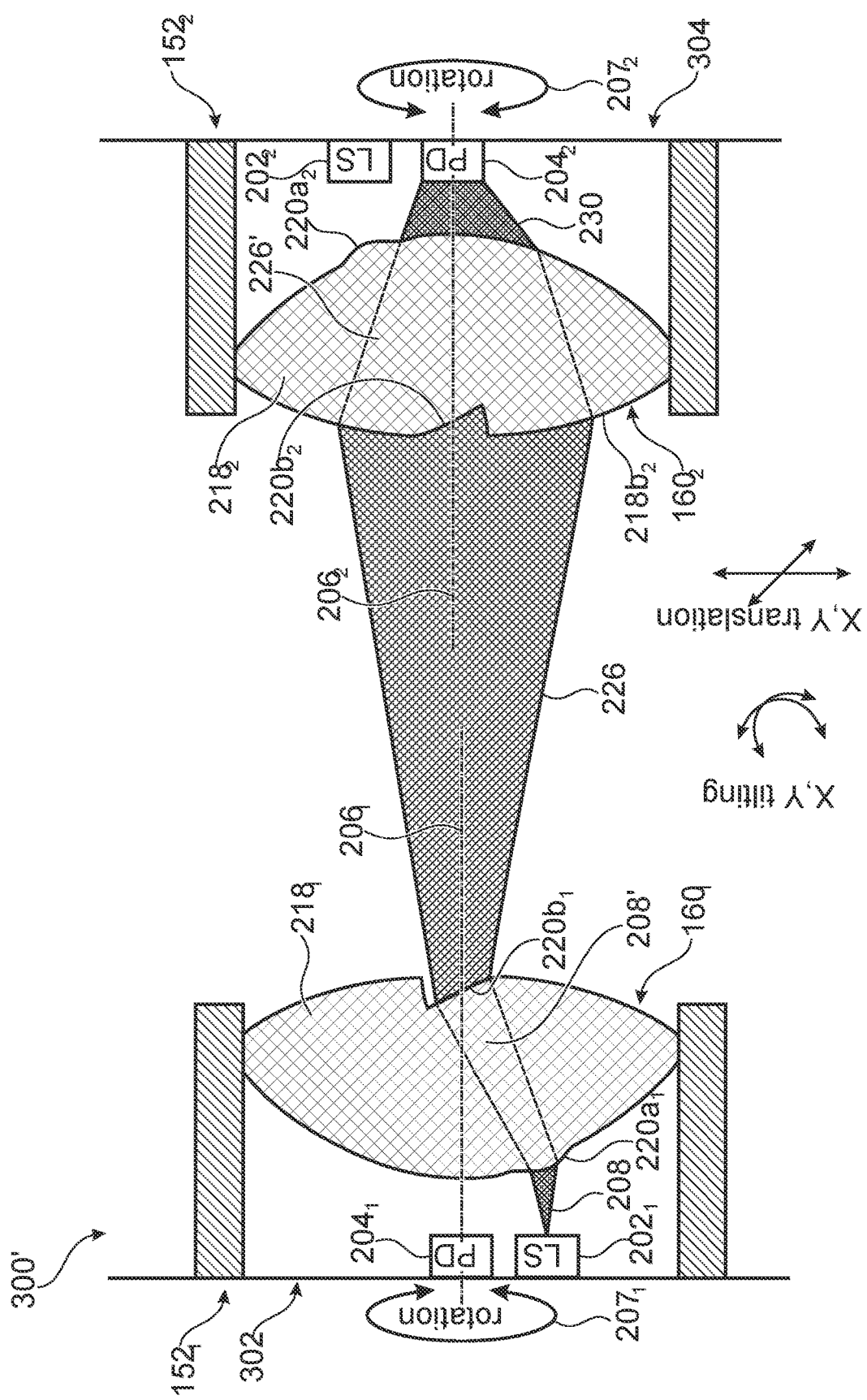
FIG. 7 shows an embodiment, similar to FIG. 6, wherein the rotatable optical short-range transceivers are arranged with an offset to each other.

FIG. 6 shows an arrangement of the two transmission/reception units $152_1$ and $152_2$ which is such that both units are located on the same optical axis, i.e. the common optical axis or common rotation axis 206 illustrated in FIG. 6. However, the present invention is not limited to such implementations. Each transceiver has its own rotation axis. These rotation axes can be identical (see FIG. 6), but typically the rotation axes are not identical. The two rotation axes can be shifted or tilted relative to each other to a certain extent so that, in accordance with further embodiments, the transmission/reception units $152_1$, $152_2$ are offset to each other so that they do not comprise a common optical axis or common rotation axis. FIG. 7 shows an implementation similar to that in FIG. 6, wherein equal elements are provided with equal reference numerals and will not be described again. In the embodiment shown in FIG. 7, the transmission/reception units $152_1$, $152_2$ are arranged at an offset to each other, as is indicated by the reference numeral 350, for example the second transmission/reception unit $152_2$ is arranged to be tilted in the X and Y directions so that the optical axes or rotation axes $206_1$, $206_2$ of the two units no longer match and exhibit a corresponding offset. The optical axis or rotation axis $206_1$ of the first transmission/reception unit $152_1$ is offset relative to the optical axis or rotation axis $206_2$ of the second transmission/reception unit $152_2$, as can be seen from FIG. 7.

The distance of the transmission/reception units $152_1$, $152_2$ arranged in a device in correspondence with FIG. 6 and FIG. 7, can be kept small, in contrast to the known technology, for example smaller than the diameter of the transmission/reception units since, due to the inventive implementation of the transmission/reception units, even with small a distance and twisting of the transmission/reception units $152_1$, $152_2$ relative to each other, the transmission beam 226 provided by the transmitting unit will always impinge on the reception optics of the receiving unit, which guides the impinging light onto the photodiode so that a reliable data transmission and data link is ensured even in the case of smaller a distance and twisting.

Figure 8:
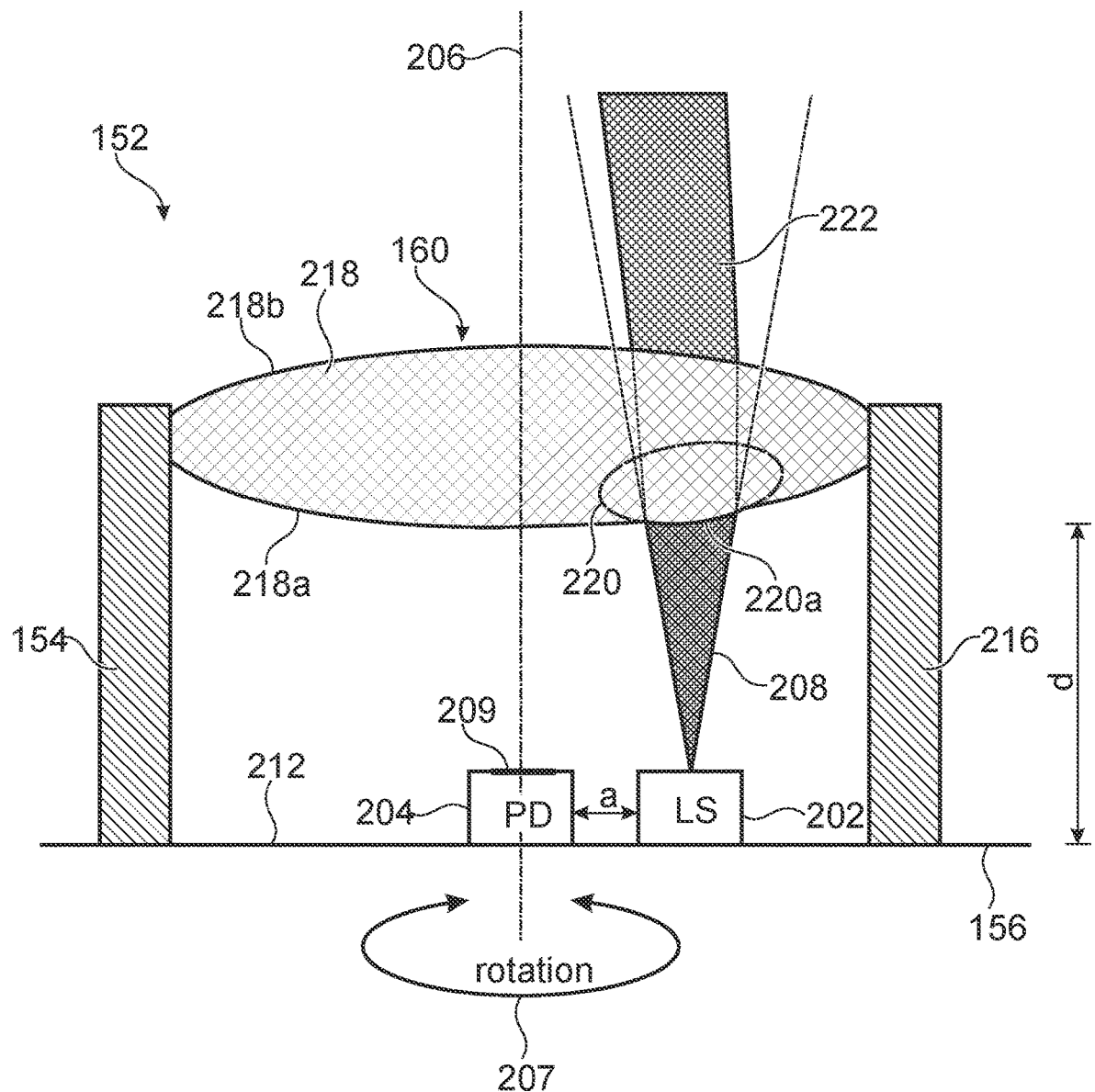
FIG. 8 shows the setup of a transmission/reception unit of a rotatable optical short-range transceiver in accordance with another embodiment of the present invention.

FIG. 8 shows the setup of a transmission/reception unit in accordance with an embodiment of the present invention, as is described, for example, in the German patent application DE10 2018 205 559 6. The transmission/reception unit 152 comprises an optical transmitter 202 and an optical receiver 204. The transmission/reception unit 152 is arranged to be rotatable around the rotation axis 206, as is indicated by the arrow 207. In FIG. 8, the transmission beam 208 is illustrated, provided by the optical transmitter 202. The optical receiver 204 is arranged such that its position matches a position of the rotation axis 206. The optical receiver 204 receives an optical reception signal from a first direction and the optical transmitter 202 transmits an optical transmission signal in a second direction which is basically opposite to the first direction. In the illustrated embodiment, the optical receiver 204, which can, for example, be formed by a photodiode, PD, comprises an active area 209 for receiving incident light. The receiver 204 is arranged in the region of the rotation axis 206 such that the rotation axis 206 is centrally on the active area 209 and perpendicular thereto. In the illustrated embodiment, the transmission/reception unit or transceiver 152 additionally comprises a support 156 and, in the illustrated embodiment, both the optical transmitter 202 and the optical receiver 204 are arranged on a surface 212 of the support. The optical transmitter 202 is arranged to be offset to the rotation axis 206 and spaced apart from the optical receiver 204. In other words, the optical receiver 204 is, relative to the rotation axis 206, arranged centrally on the support 156 and the optical transmitter 206 is, relative to the rotation axis 206, arranged outside the center or eccentrically on the support 156. The distance a between the optical receiver 204 and the optical transmitter 202 can, in accordance with embodiments, be dependent on the system design.

The transmission/reception unit 152 additionally comprises transmission/reception optics 160 arranged to be spaced apart from the support surface 212 and, thus, spaced apart from the optical transmitter 202 and the optical receiver 204. The transmission/reception unit 152 comprises a support structure 154 for mounting the transmission/reception optics 160. The support structure 154 is arranged on the support surface 212 of the support 156 and extends upwards, as is illustrated in FIG. 8, so that the transmission/reception optics is arranged to be spaced apart from the support surface 212. In accordance with an embodiment, the transmission/reception optics is arranged at a distance d from the surface 212 of the support 156, which can be in the range from the radius of the optics 160 to the diameter of the optics 160. The distance d is, as is illustrated in FIG. 8, measured along the rotation axis 208 from the support surface 212 to the optics 160.

In accordance with the invention, the transmission/reception optics 160 comprises reception optics 218 and transmission optics 220, the transmission optics 220 being arranged in the reception optics 218, as is illustrated in FIG. 8. In other words, the transmission/reception optics is formed primarily by the reception optics 218 arranged on the rotation axis 206 and extends over both the optical receiver 204 and the optical transmitter 202, wherein the transmission optics 220 is arranged in the region above the optical transmitter 202. The transmission optics 220 can exemplarily be integrated in the reception optics 218. In the embodiment illustrated in FIG. 8, the transmission optics 220 is integrated in the reception optics 218 such that a transmission beam-shaping area 220a, which faces the optical transmitter 202, protrudes beyond a first surface 218a of the reception optics 218 facing the optical receiver 204. The transmission optics 220 is integrated in the reception optics 218 such that, except for the beam-shaping area 220a, the remaining portions of the transmission optics 220 are arranged within the reception optics 218, i.e. do not extend beyond a second surface 218b of the reception optics 218 facing away from the optical receiver 204.

In accordance with the invention, it is provided for the reception optics 218 and the transmission optics 220 to be integrated with each other such that a common or single transmission/reception optics or transceiver optics 160 results, the reception optics 218 constituting the largest part of the transmission/reception optics 160. As will be discussed below in greater detail, the inventive implementation of the transmission/reception unit allows providing a data transmission device for data transmission among mutually rotatable components with a rotatability for a 360° rotation even for very short distances. This ensures a reliable and continuous data transmission and the problems, present in conventional implementations of transmission/reception units, as discussed above, are avoided. In accordance with the invention, it is provided for the electrical receiver element or optical receiver 204, which exemplarily comprises a photodiode, to be located on the rotation axis 206, and the reception optics 218 to also be located on the rotation axis 206 above the photodiode 204, as is illustrated in FIG. 8. The light source or optical transmitter 202 is located eccentrically or off-center, i.e. spaced apart from the rotation axis 206, adjacent to the photodiode 204, i.e. in direct proximity thereto. The optical transmitter 202 can comprise a laser source, like a laser diode, LD, for example, or an incoherent light source, like a light-emitting diode, LED, for example.

The light signals processed by the transmission/reception unit can comprise a wavelength in the ultraviolet range, visible range or infrared range.

As is illustrated in FIG. 8, the transmission optics 220 is located above the light source 202 and shapes the transmission beam 208 so as to obtain/shape an output beam 222 which is directed in a predetermined direction, for example onto an opposite transceiver in a signal transmission device, as will be discussed below. The transmission optics 220 is arranged such that it overlaps with the reception optics 218 at the position where the transmission optics 220 is arranged, wherein, in the embodiment illustrated in FIG. 8, only that part 220a of the transmission optics 220 protruding beyond the surface 218a of the reception optics 218 is used for beam-shaping.

However, the present invention is not limited to the implementation of the transmission/reception optics 160 in accordance with the embodiment illustrated in FIG. 8, rather, the transmission/reception optics can also be implemented differently. FIG. 9A to FIG. 9G show different implementations of the transmission/reception optics 160.

Figure 9A:
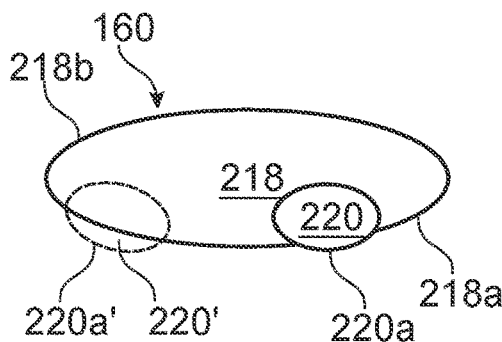
FIG. 9A-9G show different implementations for the transmission/reception optics of FIG. 8.

FIG. 9A shows the implementation of the transmission/reception optics 160, as was discussed referring to FIG. 8, in accordance with which the transmission optics 220 is integrated in the reception optics 218 such that only the beam-shaping surface 220a of the transmission optics 220 protrudes beyond the lower surface of the reception optics 218 and is available for beam-shaping of the transmission beam 208 for generating the output beam 222.

In accordance with 9B, in other embodiments, the transmission optics 220 can be integrated in the reception optics 218 such that a beam-shaping area 220b of the transmission optics 220 protrudes beyond the second surface 218b of the reception optics and is available for beam shaping of the transmission beam 208 for generating the output beam 222. In the embodiments illustrated in FIG. 9A and FIG. 9B, thus, the first and second surfaces 218a, 218b of the reception optics 218 are divided by the protruding beam-shaping area 220a, 220b of the transmission optics 220.

Figure 9D:
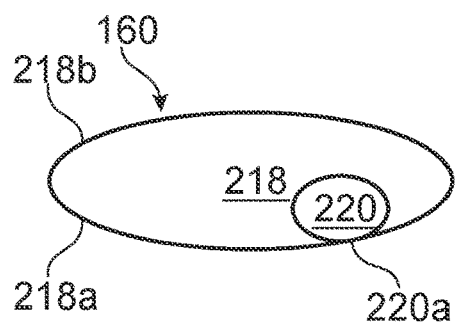
Figure 9B:
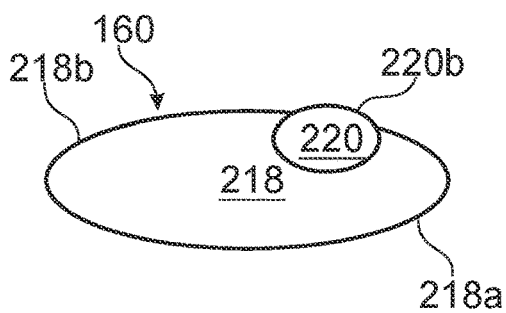
Figure 9E:
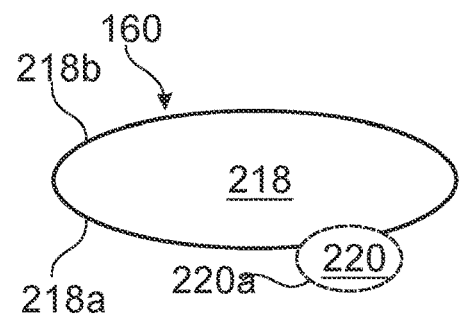
Figure 9C:
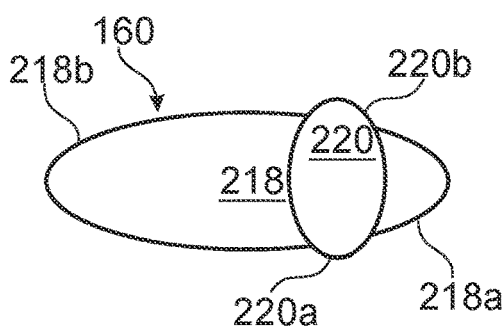
Figure 9F:
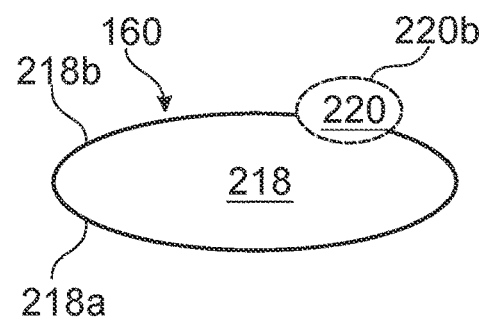
Figure 9G:
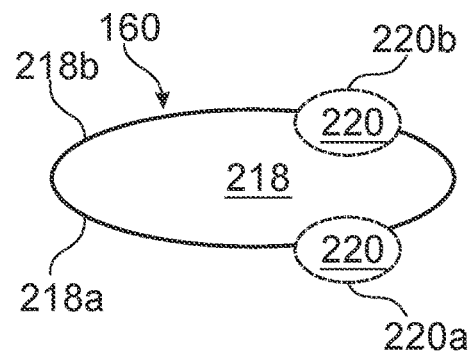

In accordance with another embodiment, which is illustrated in FIG. 9C, both surfaces 218a, 218b of the reception optics 218 can be divided by the transmission optics 220 which, in the illustrated embodiment, is integrated in the reception optics 218 such that a first beam-shaping area 220a facing the optical transmitter 202 protrudes beyond the first surface 218a of the reception optics 218 and additionally a second beam-shaping area 220b facing away from the optical transmitter 202 is provided, protruding beyond the second surface 218b of the reception optics 218.

In accordance with the embodiments shown in FIG. 9A to FIG. 9C, one or more beam-shaping surfaces of the transmission optics protrude beyond surfaces of the reception optics. In other embodiments, one or more beam-shaping surfaces of the transmission optics are recessed or subtracted relative to surfaces of the reception optics.

In the embodiment shown in FIG. 9E the beam-shaping surface 220a of the transmission optics 220 is recessed relative to the surface 218a. In the embodiment shown in FIG. 9F, the beam-shaping surface 220b of the transmission optics 220 is recessed relative to the surface 218b. In the embodiment shown in FIG. 9G, the beam-shaping surface 220a of the transmission optics 220 is recessed relative to the surface 218a and the beam-shaping surface 220b of the transmission optics 220 is recessed relative to the surface 218b.

In accordance with still further embodiments, it is not necessary for the beam-shaping areas 220a, 220b of the transmission optics 220 to protrude beyond the corresponding surfaces 218a, 218b of the reception optics 218 or to be recessed relative thereto, rather the beam-shaping areas 220a, 220b, which are also referred to as lower and upper active transmission areas, can be contained in the surfaces 218a, 218b, as is illustrated in FIG. 9D.

In accordance with the invention, at least one of the beam-shaping areas, in accordance with embodiments also both beam-shaping areas of the transmission optics 220, is/are available for beam-shaping of the transmission beam, wherein it is to be mentioned referring to FIG. 9D that the beam-shaping area 220b can of course also be contained in the surface 218b of the reception optics 218.

Figure 10:
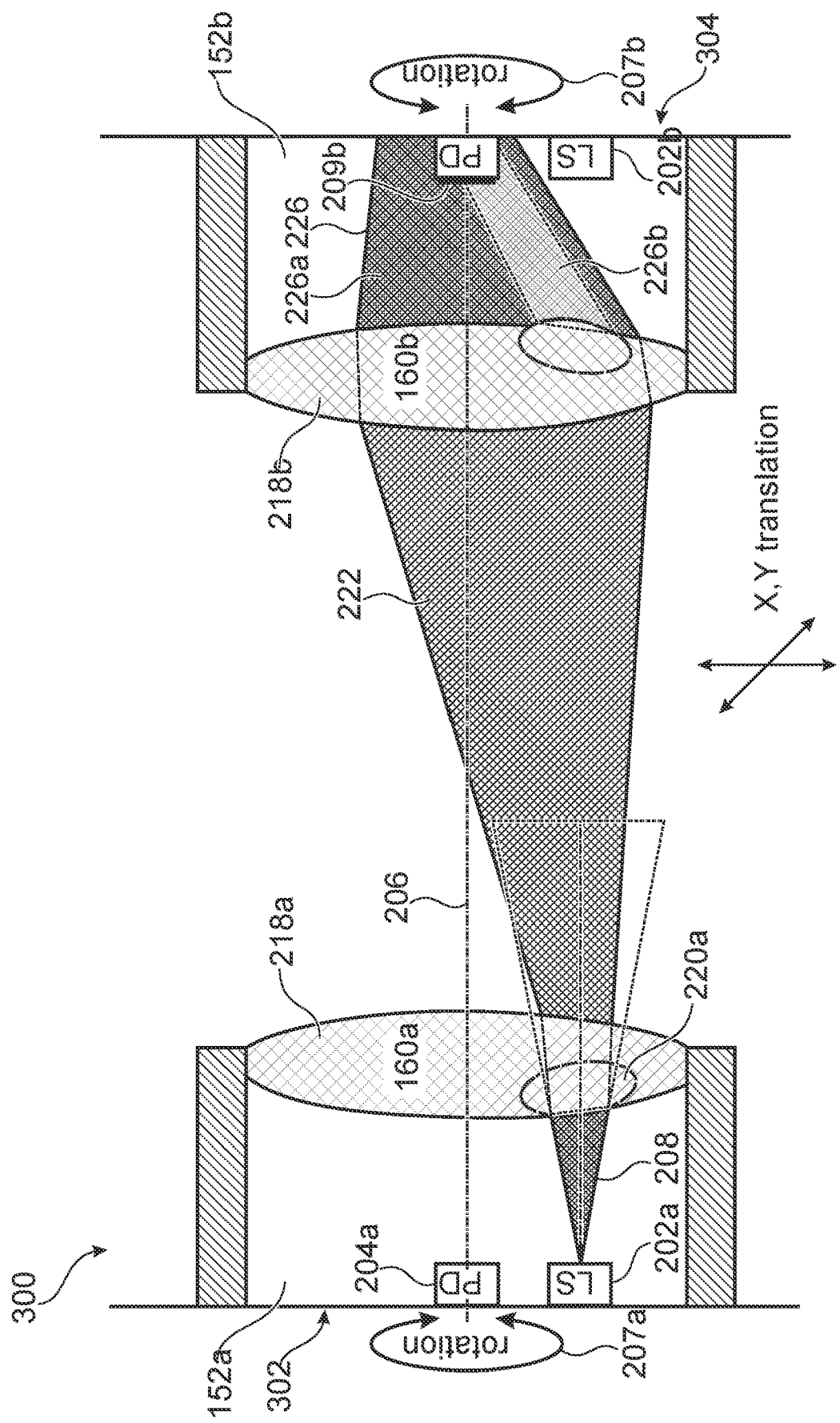
FIG. 10 shows an embodiment of signal transmission means comprising two rotatable optical short-range transceivers arranged to be rotatable relative to each other in accordance with embodiments of the present invention which are each provided with a transmission/reception unit in accordance with FIG. 8.

Subsequently, embodiments of signal transmission means using the inventive transmission/reception units, as were discussed, for example, referring to FIG. 8 and FIG. 9A-9G, will be discussed in greater detail. FIG. 10 shows an embodiment of signal transmission comprising two components or short-range transceivers 302, 304, arranged to be rotatable to each other, in accordance with the present invention which are each provided with a transmission/reception unit 152a and 152b in accordance with FIG. 8 to allow wireless optical data transmission between the two components 302, 304 arranged to be rotatable to each other.

In FIG. 10, elements of the transmission/reception unit 152a described referring to FIG. 8 are illustrated and reference numerals are provided with the suffix "a" and will not be described again. Furthermore, the transmission/reception unit 152b, associated to the second component 304, is illustrated and the corresponding components described referring to FIG. 8 are provided with the same reference numerals with the suffix "b" and will not be described again either.

FIG. 10 exemplary shows data transmission from the first component 302 to the second component 304, i.e. a unidirectional link, wherein, in accordance with other embodiments, simultaneous transmission in both directions is also possible. As is illustrated in FIG. 10, the transmission optics 220a of the transmitting transmission/reception unit 152a is implemented to shape the transmission beam 208 to form the output beam 222 such that the output beam 222 is directed onto the transmission/reception optics 160b of the receiving transmission/reception unit 152b or illuminates the transmission/reception optics. In accordance with embodiments, the receiving transmission/reception unit 152b, which can also be referred to as reception transceiver, can be shifted from the optical Z axis, which matches the rotation axis 206, in the X direction and/or Y direction, wherein the degree of shiftability depends on the specific design of the transmission and reception optics. In accordance with embodiments, the offset can be between 0 and greater than a radius of the transmission/reception optics.

The transmission beam 222 provided by the transmission transceiver or the transmitting transmission/reception unit 152a and directed to the reception optics 218b is collected by the transceiver optics 160b of the reception transceiver 152b and directed in the direction of the photodiode 204b by the first and second reception areas. FIG. 10 shows the reception beam 226 generated by the transmission/reception optics 160b, which, in the embodiment shown in FIG. 10, due to the arrangement of the transmission optics 220b within the reception optics 218b, comprises a first portion 226a which impinges at least partly on the active area 209b of the photodiode 204b and which additionally comprises a blank or non-illuminated region 226b which forms due to the arrangement/integration of the transmission optics 220 within the reception optics. In other words, the light spot imaged by the reception optics 218 onto the photodiode plane comprises the gap 226b at the location of the transmission optics or transmission lens, which is uncritical in situations in which this gap is outside the region of the active area 209 of the photodiode 204, so that the gap does not impede data transmission.

Figure 11:
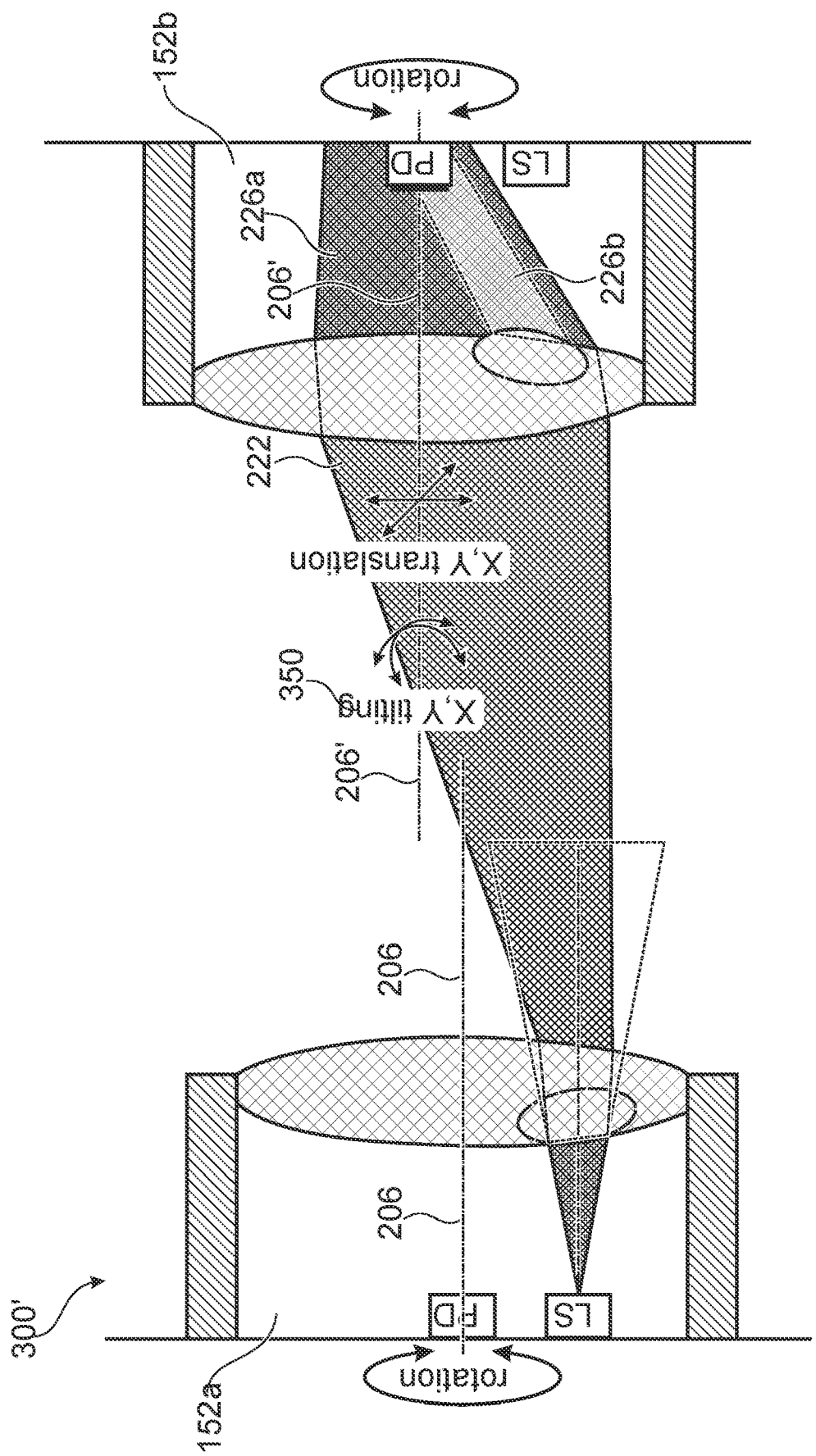
FIG. 11 shows an embodiment, similar to FIG. 10, wherein the rotatable optical short-range transceivers are arranged with an offset and tilting relative to each other.

In FIG. 10, an arrangement of the two transmission/reception units 152a and 152b is illustrated, which is such that both units are located on the same optical axis, i.e. the common optical axis or common rotation axis 206 illustrated in FIG. 10. However, the present invention is not limited to such implementations. Each transceiver has its own rotation axis. These rotation axes can (see FIG. 10) be identical, but typically are not. The two rotation axes can be shifted relative to each other to a certain extent, or be tilted so that, in accordance with further embodiments, the transmission/reception units 152a, 152b are offset relative to each other such that these do not comprise a common optical axis or common rotation axis. FIG. 11 shows an implementation, similar to that in FIG. 10, wherein equal elements are provided with equal reference numerals and will not be described again. In the embodiment shown in FIG. 11, the transmission/reception units 152a, 152b are arranged with an offset relative to each other, as is indicated by the reference numeral 350, wherein the second transmission/reception unit 152b is, for example, arranged to be tilted in the X and Y directions so that the optical axes or rotation axes 206, 206' of the two units no longer match and exhibit a corresponding offset. The optical axis or rotation axis 206 of the first transmission/reception unit 152a is offset relative to the optical axis or rotation axis 206' of the second transmission/reception unit 152b, as can be seen in FIG. 11.

Depending on the arrangement of the elements among one another, for example depending on a tilting or offset, situations may arise in which the non-illuminated portion 226b migrates to the region of the active area of the photodiode, which would result in an interruption of the data link. In order to avoid such situations, in accordance with embodiments, an additional surface structure may be provided, as will be discussed below referring to FIG. 12.

Figure 12:
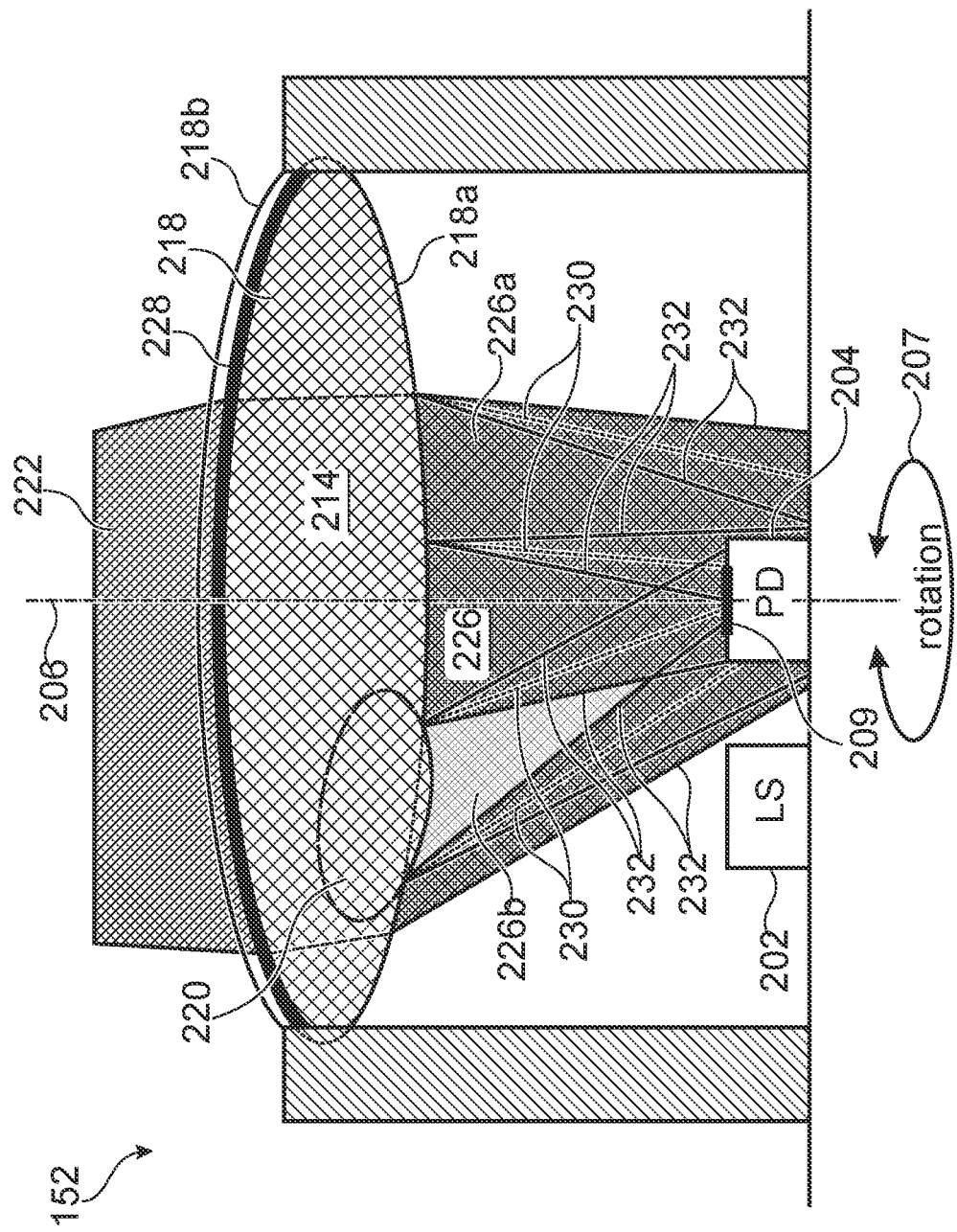
FIG. 12 shows an embodiment of the inventive rotatable optical short-range transceiver in which the transmission/reception optics comprises a surface structure at a surface.

In accordance with embodiments, it may be provided for to avoid or close the gap 226b mentioned above to avoid an interruption in the data transmission in situations in which, for example due to tilting or an offset (FIG. 11) of the components 302, 304, the gap is located in the region of the active area of the photodiode. In order to avoid or close the mentioned gap, in accordance with embodiments, the transmission/reception optics is provided with a predetermined surface structure to specifically change the ideal beam imaging, for example, so that the focused beams are also specifically directed to the positions in the gap. This smooths the illumination by the reception beam and closes the potential transmission gap. At the same time, any other advantageous illumination can be provided by means of the surface structure. FIG. 12 shows an embodiment of the inventive transmission/reception unit 152 in which the transmission/reception optics 160 comprises, at the second surface, the surface 218b facing away from the receiver, the surface structure just mentioned which, in FIG. 12, is schematically referred to by the reference numeral 228. In accordance with further embodiments, it may be provided for to arrange the structure 226 on the surface 218a facing the receiver and, in accordance with still other embodiments, the structure 228 may be provided at both surfaces 218a, 218b. However, it is to be mentioned here that the structure 228 is arranged on the surfaces 218, 218b such that the region where the transmission optics 220 is formed, or the regions of the beam forming areas 220a, 220b of transmission optics 220 are not provided with the surface structure 228. In accordance with embodiments, the structure 228 is either provided by processing the corresponding surfaces 218a and 218b or the transmission/reception optics is, at the surfaces 218a, 218b, provided with or coated with an additional layer providing the corresponding surface structure, wherein the coating is such that, as has been mentioned, regions of the transmission optics which define the beam-shaping area 220a, 220b are left out.

FIG. 12 schematically illustrates ideal beam imaging using the reference numeral 230, as is obtained without the surface structure 228. Due to the surface structure, the changed beams provided with the reference numeral 232 result so that the non-illuminated region 226b of the reception beam 226 is reduced and the gap 226b is closed in particular in the region of the optical receiver 160 or in the region of the active surface 209 thereof.

In accordance with embodiments, the surface structure 228 comprises an implementation of the surfaces of the optics 160 with a predetermined surface roughness or the layer applied onto the optics 160 is provided with such a surface roughness. In accordance with still further embodiments, instead of the predetermined surface roughness, structuring of the applied layer or surfaces of the optics 160 can be performed so that predetermined, repeating structures form, resulting in a change in the beams in the manner described before.

The distance of the transmission/reception units 152a, 152b which are arranged in a device in correspondence with FIG. 10 and FIG. 11, can be kept small, in contrast to the known technology, for example smaller than the diameter of the transmission/reception units, since, due to the inventive implementation of the transmission/reception units, the transmission beam 222 provided by the transmitting units always impinges on the reception optics of the receiving unit, the reception optics guiding the incident light onto the photodiode, even with small a distance and twisting of the transmission/reception units 152, 152b so that a reliable data transmission or data link is ensured, even with smaller a distance and twisting.

Figure 13A:
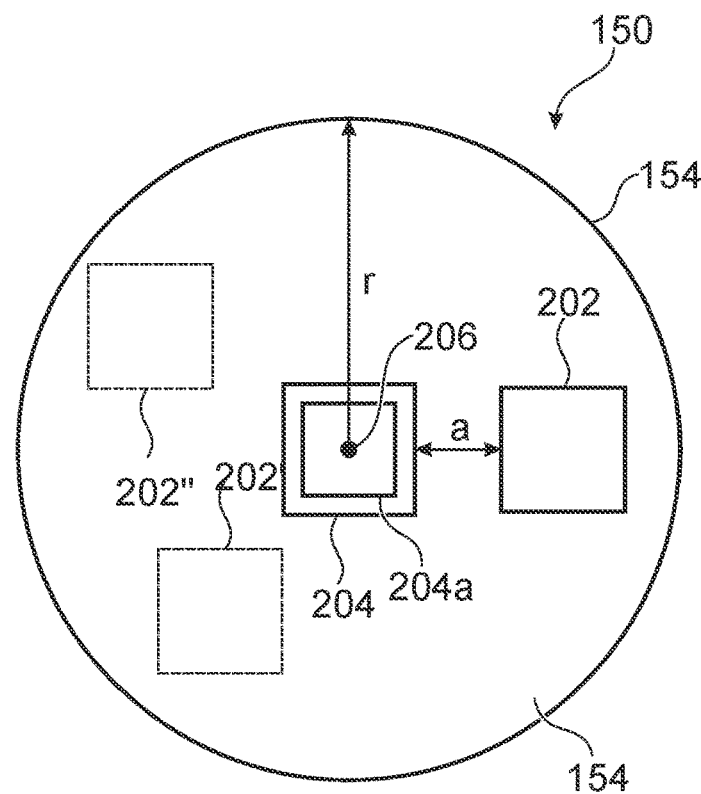
FIG. 13A-13B shows embodiments for the design of the rotatable optical short-range transceiver in top view, FIG. 13A illustrating a round or circular design of the rotatable optical short-range transceiver and FIG. 13B illustrating a rectangular or squared design of the rotatable optical short-range transceiver.
Figure 13B:
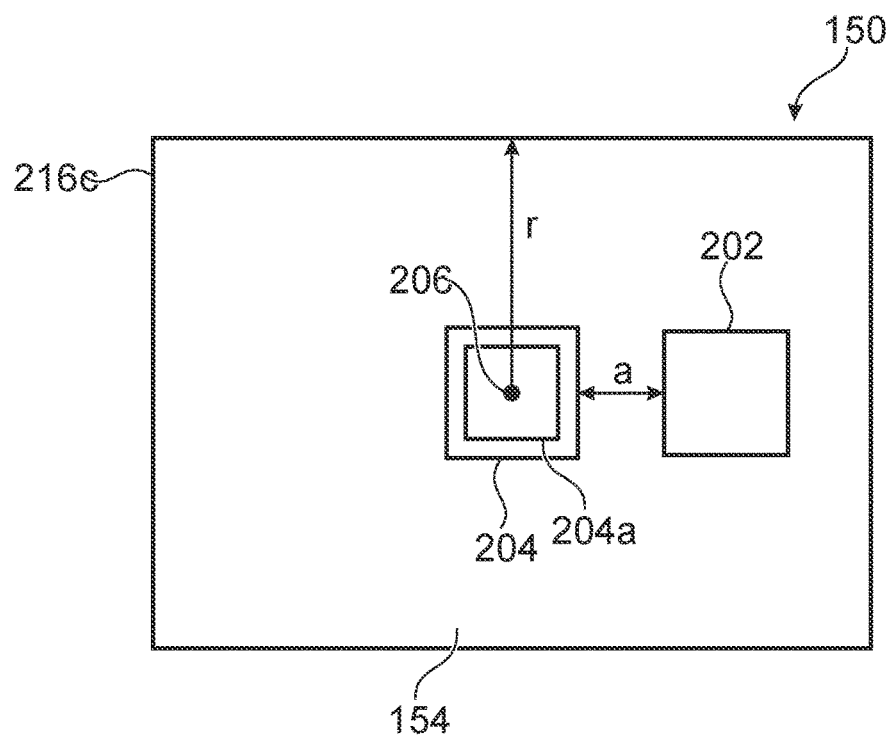

In accordance with embodiments of the present invention, the short-range transceiver can exhibit different shapes in top view. FIGS. 13A and 13B shows two embodiments for the implementation of the sort-range transceiver in top view, wherein FIG. 13A illustrates a round or circular implementation of the short-range transceiver 150 and FIG. 13B illustrates a rectangular or squared implementation of the short-range transceiver 150. It is obvious for the person skilled in the art that the short-range transceiver 150 can comprise any, like polygonal or oval, shape.

FIG. 13A shows a circular short-range transceiver 150 having a radius r measured from the rotation axis 206 to the circularly implemented holder or wall 154, implemented to be integrally with the transmission/reception optics, not illustrated. In addition, FIG. 13A indicates a further embodiment in accordance with which one or more additional optical transmitters 202', 202" can be provided at the same or a different distance to the optical receiving means 204. In the embodiment illustrated in FIG. 13A, the holder 154 is illustrated to be circumferential, but can also be implemented by individual supports or the like for holding the transmission/reception optics.

Provided one or more additional optical transmitters 202', 202" are provided in accordance with embodiments, the transmission/reception optics 160 comprises additional transmission optics, which are integrated in the reception optics 218, which is illustrated exemplarily in FIG. 5C or in FIG. 9A. The additional transmission optics is arranged above the optical transmitter 220' and comprises the portions 220a' and 220b' for tilting/redirecting and, maybe, for beam shaping of the transmission beam which is provided by the additional optical transmission unit 202'. The additional transmission optics can, in accordance with further embodiments, be implemented to be similar to the transmission optics 220, i.e. in the form of the embodiments illustrated in FIG. 5A, FIG. 5B or FIG. 5D or in the form of the embodiments illustrated in FIGS. 9B to 9D.

FIG. 13B shows a rectangular implementation of the short-range transceiver 150, wherein the distance from the rotation axis 206 to the edge of the short-range transceiver 150 is referred to by radius r.

Figure 14A:
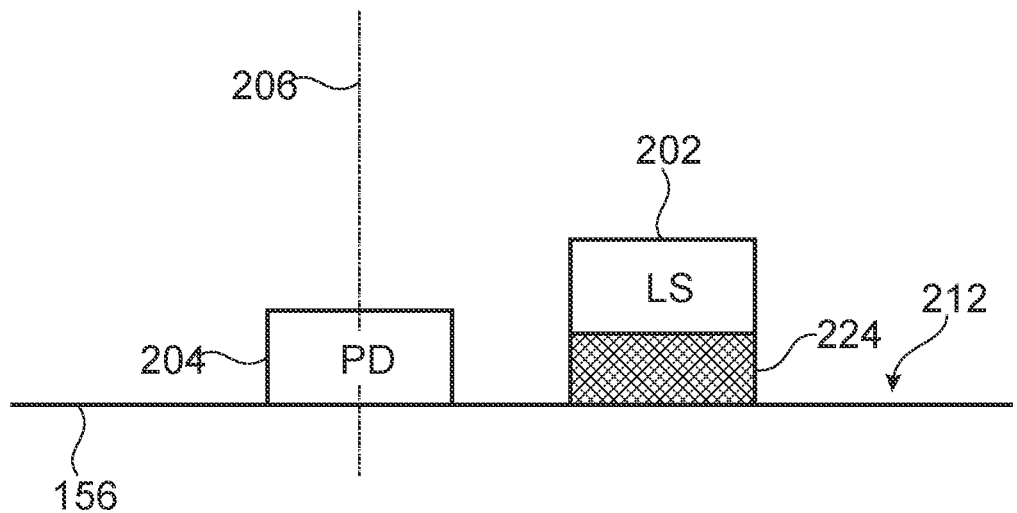
FIG. 14A-14B shows different implementations for the arrangement of optical transmitter/receiver on a support of the rotatable optical short-range transceiver.
Figure 14B:
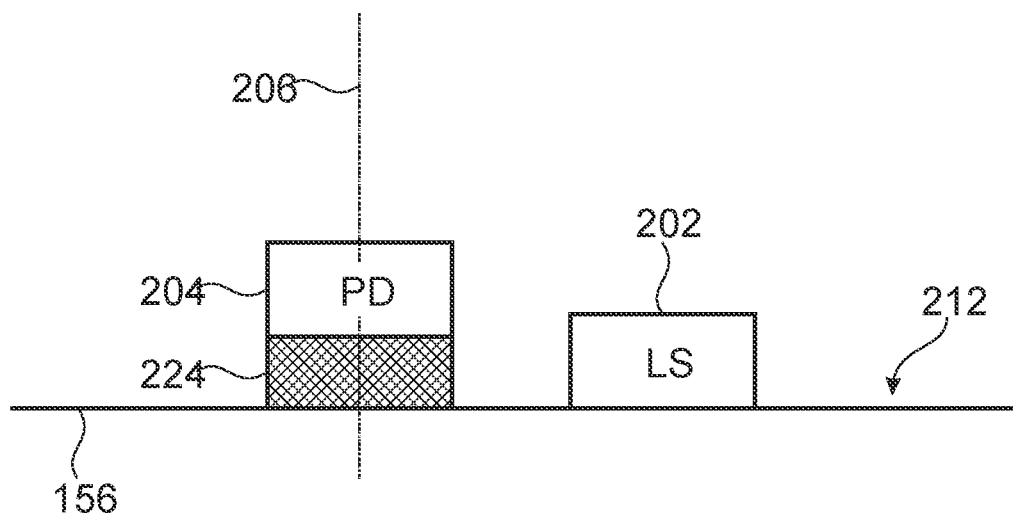

In the embodiments illustrated referring to FIG. 4 and FIG. 8, the optical transmitter 202 and the optical receiver 204 are both arranged on the surface 212 of the support 156. However, the present application is not limited to such an arrangement, rather the elements 202, 204 can be arranged at equal or different distances to the surface 212. FIGS. 14A and 14B shows potential embodiments of such an implementation, wherein FIG. 14A illustrates an implementation in which the optical transmitter 202 is arranged to be spaced apart from the support surface 212 by means of a suitable distancing element 224, wherein the optical receiver 204 is located on the support surface 212. FIG. 14B shows another embodiment in which the optical receiver 204 is arranged to be spaced apart from the surface 212 of the support 156 using a suitable spacer 224, whereas the optical transmitter 202 is arranged on the surface 212. In still further embodiments, as mentioned, both the optical transmitter 202 and the optical receiver 204 can be arranged to be spaced apart from the surface of the support by a suitable spacer 224, wherein the distances for the optical transmitter and the optical receiver can be equal or different.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A rotatable optical short-range transceiver comprising:
a support which is rotatable around a rotation axis,
an optical receiver which is arranged at the support on the rotation axis to receive an optical reception signal from a first direction,
an optical transmitter which is arranged at the support to be adjacent to the optical receiver to emit an optical transmission signal in a second direction, and
an optical transmission/reception unit which is configured to allow interruption-free rotatable optical data communication,
wherein the optical transmission/reception unit is arranged at the support above the optical receiver and extends over the optical receiver and the optical transmitter,
wherein the optical transmission/reception unit comprises a support structure for mounting at the support, which is implemented integrally with the optical transmission/reception unit,
wherein the optical transmission/reception unit comprises a reception optics and a transmission optics
wherein the reception optics is
arranged at the support on the rotation axis above the optical receiver and extending over the optical receiver and the optical transmitter, and a transmission optics arranged in the reception optics, and
configured to direct the optical reception signal impinging on the transmission/reception optics in the direction of the optical receiver on the rotation axis,
wherein the transmission optics is
configured to shift the optical transmission signal emitted by the optical transmitter to the rotation axis so that a transmission beam leaves the transmission/reception optics in the region of the rotation axis, and formed by a first portion of a surface of the reception optics facing the optical receiver and by a second portion of a surface of the reception optics facing away from the optical receiver,
wherein the first portion is configured to deflect the optical transmission signal emitted by the optical transmitter in the direction to the rotation axis and direct the same onto the second portion, and
wherein the second portion is configured to deflect the optical transmission signal received from the first portion in a direction parallel to the rotation axis.

2. The rotatable optical short-range transceiver in accordance with claim 1, wherein the optical transmission/reception unit and the support structure are implemented integrally as one component or are integrated in one component.

3. The rotatable optical short-range transceiver in accordance with claim 1, wherein the optical transmission/reception unit comprising the support structure is manufactured by optical injection molding, optical 3D printing or mechanical precision milling.

4. The rotatable optical short-range transceiver in accordance with claim 1, wherein the optical transmission/reception unit is placed on the support, wherein the optical transmission/reception unit comprising the support structure forms a component envelope together with the support.

5. The rotatable optical short-range transceiver in accordance with claim 1, wherein the support comprises one of the following: a printed circuit board, PCB, a chip package, a Quad Flat No Leads, QFN, Package, a Quad Flat, QFP, Package, a Small Outline Transistor, SOT, Package or a Dual In-Line, DIL, Package.

6. The rotatable optical short-range transceiver in accordance with claim 1, wherein the support comprises one or more electrical components apart from the optical receiver and the optical transmitter, and wherein the optical receiver, the optical transmitter and the one or more electrical components are electrically connected by conductive traces and/or bonds.

7. The rotatable optical short-range transceiver in accordance with claim 6, wherein the optical receiver comprises a photodiode, PD, and wherein the one or more electrical components, comprise at least one amplifier downstream of the photodiode and amplifying the reception signal.

8. The rotatable optical short-range transceiver in accordance with claim 6, wherein the optical transmitter comprises a laser diode, LD, and wherein the one or more electrical components comprise a laser driver unit for controlling the laser diode.

9. The rotatable optical short-range transceiver in accordance with claim 1, wherein the support comprises a plurality of electrical connections to the outside and wherein the optical receiver, the optical transmitter and the one or more electrical components are electrically connected to the electrical connections to the outside by conductive traces and/or bonds.

10. The rotatable optical short-range transceiver in accordance with claim 1, which can be soldered onto a board and be integrated in a system or machine to allow optical rotatable short-range data communication.

11. The rotatable optical short-range transceiver in accordance with claim 1, wherein the transmission optics shifts the optical transmission signal emitted by the optical transmitter to the rotation axis such that the transmission beam leaves the optical transmission/reception unit centrally.

12. The rotatable optical short-range transceiver in accordance with claim 1, wherein the transmission optics shifts the optical transmission signal emitted by the optical transmitter to the rotation axis such that the transmission beam is basically parallel to the rotation axis.

13. The rotatable optical short-range transceiver in accordance with claim 1, wherein
the reception optics comprises a first reception area on the surface of the reception optics facing the optical receiver and a second reception area on the surface of the reception optics facing away from the optical receiver,
wherein the first reception area and the second reception area are implemented as spherical, aspherical or freeform optics.

14. The rotatable optical short-range transceiver in accordance with claim 13, wherein the first reception area and the second reception area are implemented differently.

15. The rotatable optical short-range transceiver in accordance with claim 1,
wherein the transmission optics is arranged above the optical transmitter and is configured to shape the optical transmission signal emitted by the optical transmitter to form an output beam.

16. The rotatable optical short-range transceiver in accordance with claim 15, wherein the transmission optics is arranged at least partly in the reception optics, wherein a portion of the transmission optics facing the optical transmitter forms a first beam-shaping area for shaping the optical transmission signal, wherein the first beam-shaping area
is formed at least partly in a surface of the reception optics facing the optical receiver, or
protrudes at least partly beyond the surface of the reception optics facing the optical receiver or is recessed relative thereto.

17. The rotatable optical short-range transceiver in accordance with claim 15, wherein the transmission optics is arranged at least partly in the reception optics, wherein a portion of the transmission optics facing away from the optical transmitter forms a second beam-shaping area for shaping the optical transmission signal, wherein the second beam-shaping area
is formed at least partly in a surface of the reception optics facing away from the optical receiver, or
protrudes at least partly beyond the surface of the reception optics facing away from the optical receiver or is recessed relative thereto.

18. The rotatable optical short-range transceiver in accordance with claim 15, wherein the transmission optics is arranged at least partly in the reception optics,
wherein a portion of the transmission optics facing the optical transmitter forms a first beam-shaping area for shaping the optical transmission signal, wherein the first beam-shaping area
is formed at least partly in a surface of the reception optics facing the optical receiver, or
protrudes at least partly beyond the surface of the reception optics facing the optical receiver or is recessed relative thereto, and
wherein a portion of the transmission optics facing away from the optical transmitter forms a second beam-shaping area for shaping the optical transmission signal, wherein the second beam-shaping area
is formed at least partly in a surface of the reception optics facing away from the optical receiver, or
protrudes at least partly beyond the surface of the reception optics facing away from the optical receiver or is recessed relative thereto.

19. The rotatable optical short-range transceiver in accordance with claim 16, wherein the surface of the reception optics facing the optical receiver is divided into two portions by the portion of the transmission optics facing the optical transmitter such that the surface of the reception optics facing away from the optical receiver and the two portions of the surface of the reception optics facing the optical receiver direct the optical reception signal impinging on the reception optics in the direction to the optical receiver on the rotation axis.

20. The rotatable optical short-range transceiver in accordance with claim 16, wherein the surface facing the optical receiver and/or the surface of the reception optics facing away from the optical receiver comprise/comprises a certain surface structure so that regions between the reception optics and the support not illuminated due to the transmission optics arranged in the reception optics are illuminated.

21. The rotatable optical short-range transceiver in accordance with claim 16, wherein the surface facing the optical receiver and/or the surface of the reception optics facing away from the optical receiver is/are provided with a layer with a certain surface structure so that regions between the reception optics and the support not illuminated due to the transmission optics arranged in the reception optics are illuminated.

22. The rotatable optical short-range transceiver in accordance with claim 1, wherein the support comprises a support surface from which the rotation axis extends perpendicularly.

23. The rotatable optical short-range transceiver in accordance with claim 22, wherein the optical receiver and the optical transmitter are arranged on the support surface, or wherein the optical receiver and the optical transmitter are arranged at the support surface at equal or different distances from the support surface.

24. The rotatable optical short-range transceiver in accordance with claim 1, comprising at least one further optical transmitter arranged at the support to be adjacent to the optical receiver, wherein the reception optics comprises at least one further transmission optics integrated in the reception optics.

25. The rotatable optical short-range transceiver in accordance with claim 1, wherein a wavelength of the optical reception signal and the optical transmission signal is in the ultraviolet range, visible range or infrared range.

* * * * *